United States Patent
Lee et al.

(10) Patent No.: US 10,366,246 B2
(45) Date of Patent: Jul. 30, 2019

(54) ELECTRONIC DEVICE AND OPERATING METHOD THEREOF

(71) Applicant: SAMSUNG ELECTRONICS CO., LTD., Suwon-si, Gyeonggi-do (KR)

(72) Inventors: Kyungryol Lee, Suwon-si (KR); Byeong-Cheol Gil, Suwon-si (KR); Dae-Hui Kim, Suwon-si (KR); Hakjoo Kim, Yongin-si (KR); Sangho Park, Anyang-si (KR); Yong-Jun Park, Suwon-si (KR); Jong-Cheul Park, Suwon-si (KR); Gwiho Lee, Uiwang-si (KR); Ho-Dong Jwa, Suwon-si (KR); Wooyoung Choi, Hwaseong-si (KR); Jin Choi, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 183 days.

(21) Appl. No.: 15/403,267

(22) Filed: Jan. 11, 2017

(65) Prior Publication Data
US 2017/0243023 A1    Aug. 24, 2017

(30) Foreign Application Priority Data
Feb. 19, 2016    (KR) .................. 10-2016-0020041

(51) Int. Cl.
*G06F 21/60*    (2013.01)
*G06F 21/62*    (2013.01)
*G06F 3/0484*    (2013.01)

(52) U.S. Cl.
CPC ........ *G06F 21/6218* (2013.01); *G06F 21/606* (2013.01); *G06F 3/0484* (2013.01)

(58) Field of Classification Search
CPC ... G06F 21/6218; G06F 21/606; G06F 3/0484
See application file for complete search history.

(56) References Cited

U.S. PATENT DOCUMENTS

| | | | |
|---|---|---|---|
| 8,385,916 B2* | 2/2013 | Raleigh ............ | G06Q 10/06375 455/432.1 |
| 8,438,653 B2* | 5/2013 | Dutta .................... | G06F 21/554 726/25 |
| 8,800,003 B2* | 8/2014 | Guo ..................... | H04L 63/0823 726/4 |
| 2005/0044381 A1* | 2/2005 | Larsen ................ | G06F 21/6218 713/182 |
| 2005/0091524 A1* | 4/2005 | Abe .................... | G06F 21/6245 726/26 |
| 2012/0255010 A1* | 10/2012 | Sallam ................. | G06F 21/572 726/24 |
| 2013/0205412 A1* | 8/2013 | Ricci .................... | G06F 3/0484 726/29 |
| 2015/0350222 A1* | 12/2015 | Hashimoto .......... | H04L 63/102 726/3 |

\* cited by examiner

*Primary Examiner* — Khoi V Le
(74) *Attorney, Agent, or Firm* — Nixon & Vanderhye P.C.

(57) ABSTRACT

An electronic device and an method of operating an electronic device according to various example embodiments include: acquiring one of a plurality of pieces of identification information which are already registered; setting one of a plurality of function sets which are already registered based on the acquired identification information; and allowing access based on the set function set.

12 Claims, 15 Drawing Sheets

ELECTRONIC DEVICE AND OPERATING METHOD THEREOF

CROSS-REFERENCE TO RELATED APPLICATION

The present application is based on and claims priority under 35 U.S.C. § 119 to an application filed in the Korean Intellectual Property Office on Feb. 19, 2016 and assigned Serial No. 10-2016-0020041, the contents of which are incorporated by reference herein in its entirety.

BACKGROUND

1. Technical Field

The present disclosure relates generally to an electronic device and an operating method thereof.

2. Description of Related Art

With the recent development of digital technology, various types of electronic devices, such as mobile communication terminals, smart phones, tablet personal computers (PCs), personal digital assistants (PDAs), electronic schedulers, notebooks, or wearable devices, are widely used. The electronic devices have now reached a mobile convergence phase encompassing the functions of other devices. For example, the electronic devices are able to provide a telephony function such as a voice call and a video call, a message sending and reception function such as a short message service (SMS)/multimedia message service (MMS) and an email, an electronic scheduler function, a capturing function, a broadcast reproduction function, a video playing function, a music playing function, an Internet function, a messenger function, a game function, a social networking service (SNS) function, or the like.

However, the above-described electronic device determines whether to allow user's access to the electronic device or not based on identification information of a user. In addition, when the user's access is allowed, the electronic device allows the user's access to all of the functions of the electronic device. Therefore, there is a problem that the security of the electronic device is undermined.

SUMMARY

An example embodiment of the present disclosure may provide an electronic device. The electronic device may include: a memory; and a processor functionally connected to the memory. The processor may be configured to: acquire one of a plurality of pieces of identification information which are already registered; set one of a plurality of function sets which are already registered based on the acquired identification information; and permit access based on the set function set.

Another example embodiment of the present disclosure may provide a method of operating an electronic device. The method may include: acquiring one of a plurality of pieces of identification information which are already registered; setting one of a plurality of function sets which are already registered based on the acquired identification information; and permitting access based on the set function set.

Still another example embodiment of the present disclosure may provide a recording medium which records a program for performing: acquiring one of a plurality of pieces of identification information which are already registered; setting one of a plurality of function sets which are already registered based on the acquired identification information; and permitting access based on the set function set.

BRIEF DESCRIPTION OF THE DRAWINGS

The above and other aspects and features of the present disclosure and its attendant advantages may be more readily appreciated and understood from the following detailed description, taken in conjunction with the accompanying drawings, in which like reference numerals refer to like elements, and wherein.

DETAILED DESCRIPTION

Figure 1:
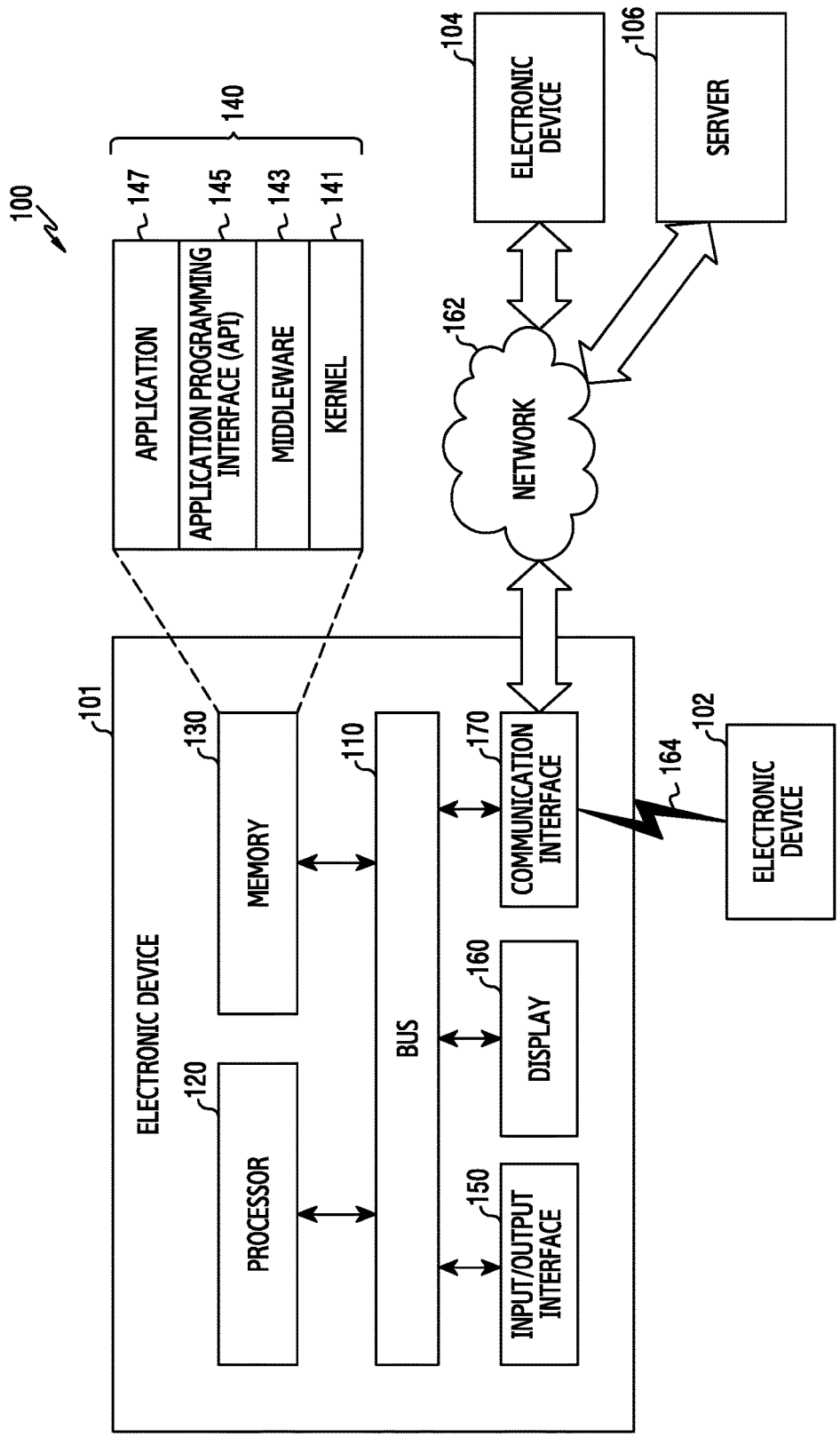
FIG. 1 is a block diagram illustrating an example network environment system according to various example embodiments.

FIGS. 1 through 14, discussed below, and the various example embodiments used to describe the principles of the present disclosure are made by way of illustration only and should not be understood to limit the scope of the disclosure in any way. Those skilled in the art will understand that the principles of the present disclosure may be implemented in any suitably arranged electronic device.

Hereinafter, various example embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments illustrated in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. On the other hand, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily refer to "specifically designed to" in a hardware level. Instead, the expression "apparatus configured to . . . " may refer to a situation in which the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various example embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch), or the like, but is not limited thereto.

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV®); a game console (e.g., Xbox®, PlayStation®); an electronic dictionary; an electronic key; a camcorder; or an electronic frame, or the like, but is not limited thereto.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like), or the like, but is not limited thereto.

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), or the like, but is not limited thereto.

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a diagram illustrating an example network environment 100 including an example electronic device 101 according to various example embodiments. Referring to FIG. 1, the electronic device 101 may include a bus 110, a processor (e.g., including processing circuitry) 120, a memory 130, an input/output (I/O) interface (e.g., including input/output circuitry) 150, a display 160, and a communication interface (e.g., including communication circuitry) 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 may include various processing circuitry, such as, for example, and without limitation, a dedicated processor, a central processing unit (CPU), a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include any suitable type of volatile or non-volatile memory. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may include various input/output circuitry configured to transfer an instruction or data input from a user via an I/O unit including input/output circuitry (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may include various communication circuitry and connect communication between the electronic device 101 and an external device (for example, the electronic device 104 or the server 106). For example, the communication interface 170 may be connected to a network 162 through wireless communication or wired communication, and may communicate with an external device via, for example, short-range communication 164.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
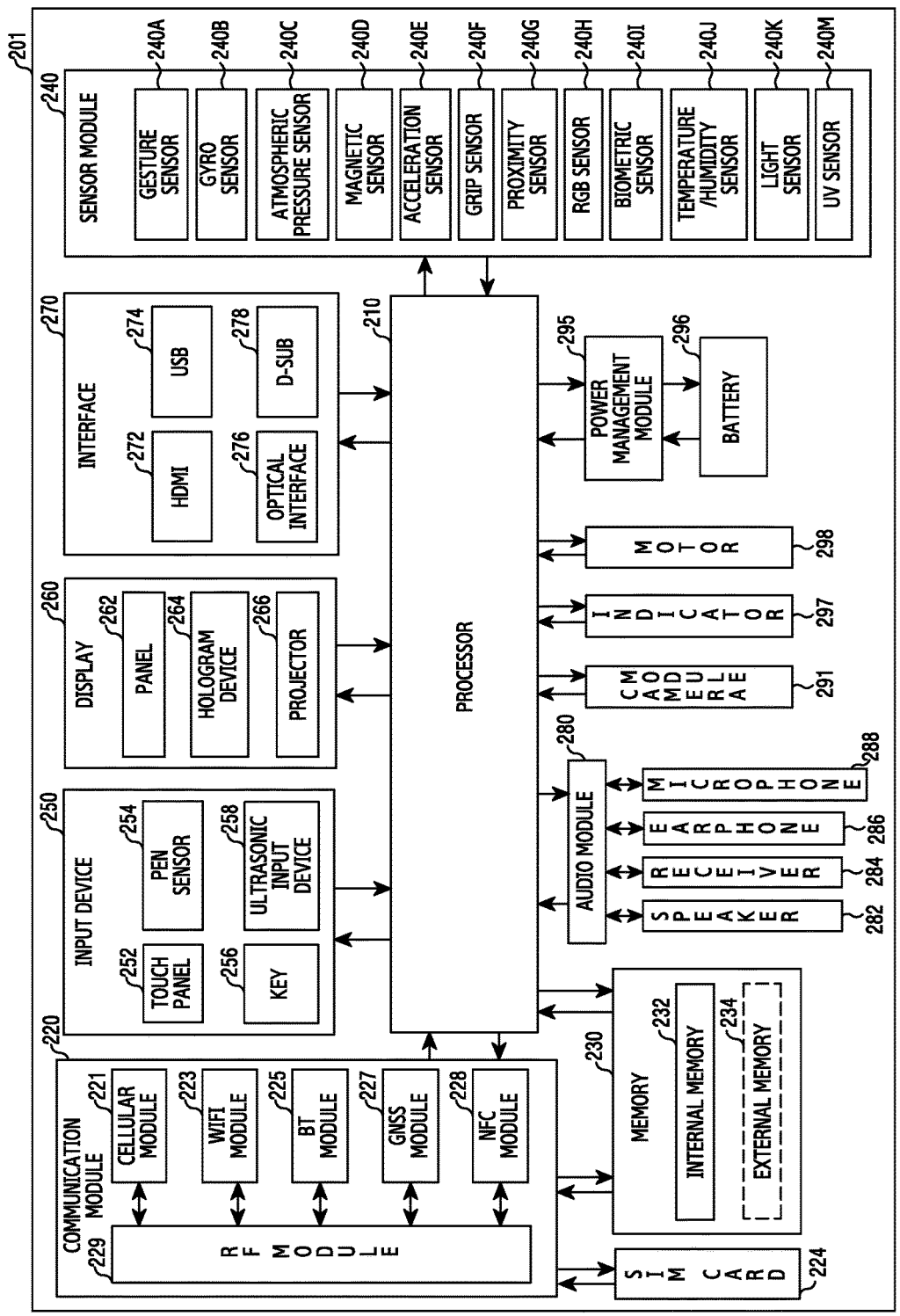
FIG. 2 is a block diagram illustrating an example electronic device according to various example embodiments.

FIG. 2 is a block diagram illustrating an electronic device 201 according to various example embodiments of the present disclosure. The electronic device 201 may configure, for example, all or a portion of the electronic device 21 illustrated in FIG. 1. Referring to FIG. 2, the electronic device 201 may include one or more application processors (AP) (e.g., including processing circuitry) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may include various processing circuitry, such as, for example, and without limitation, a dedicated processor, a CPU, or the like, and may be implemented, for example, as a system on chip (SoC). According to an embodiment, the AP 210 may further include at least one of a graphic processing unit (GPU) or image signal processor. According to an embodiment, the AP 210 may be implemented to include at least a portion (e.g., the cellular module 221) of the above-described elements. Also, the AP 210 may stores data received from at least one of other elements or generated by at least one of other elements in a non-volatile memory.

The communication module 220 (e.g., the communication interface 160) may include various communication circuitry configured to perform data transmission/reception in communication between the electronic device 201 (e.g., the electronic device 21) and other electronic devices (e.g., the electronic device 24 or the server 26) connected via a network. According to an embodiment, the communication module 220 may include various communication circuitry, such as, for example, and without limitation, a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identify module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identity module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 and/or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., RGB (red, green, blue) sensor), a biometric sensor 240I, a temperature/humidity sensor 240J, an illuminance (e.g., light) sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include various input circuitry, such as, for example, and without limitation, a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and reduce an amount of or prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
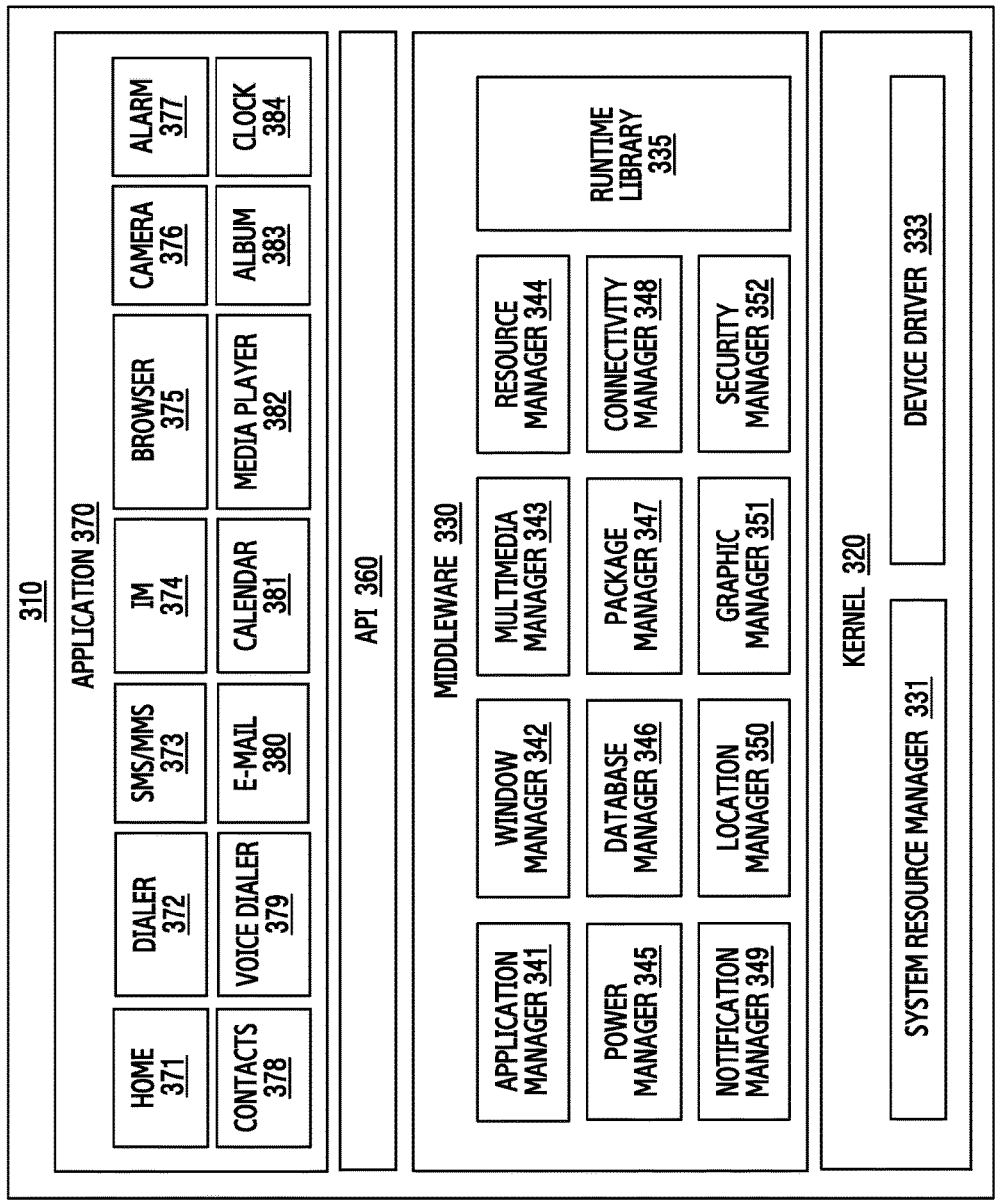
FIG. 3 is a block diagram illustrating an example program module according to various example embodiments.

FIG. 3 is a block diagram illustrating an example program module 310 according to various example embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android®, iOS®, Windows®, Symbian®, Tizen®, Bada®, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

The term "module" as used herein may, for example, refer, for example, to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, a dedicate processor, a CPU, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
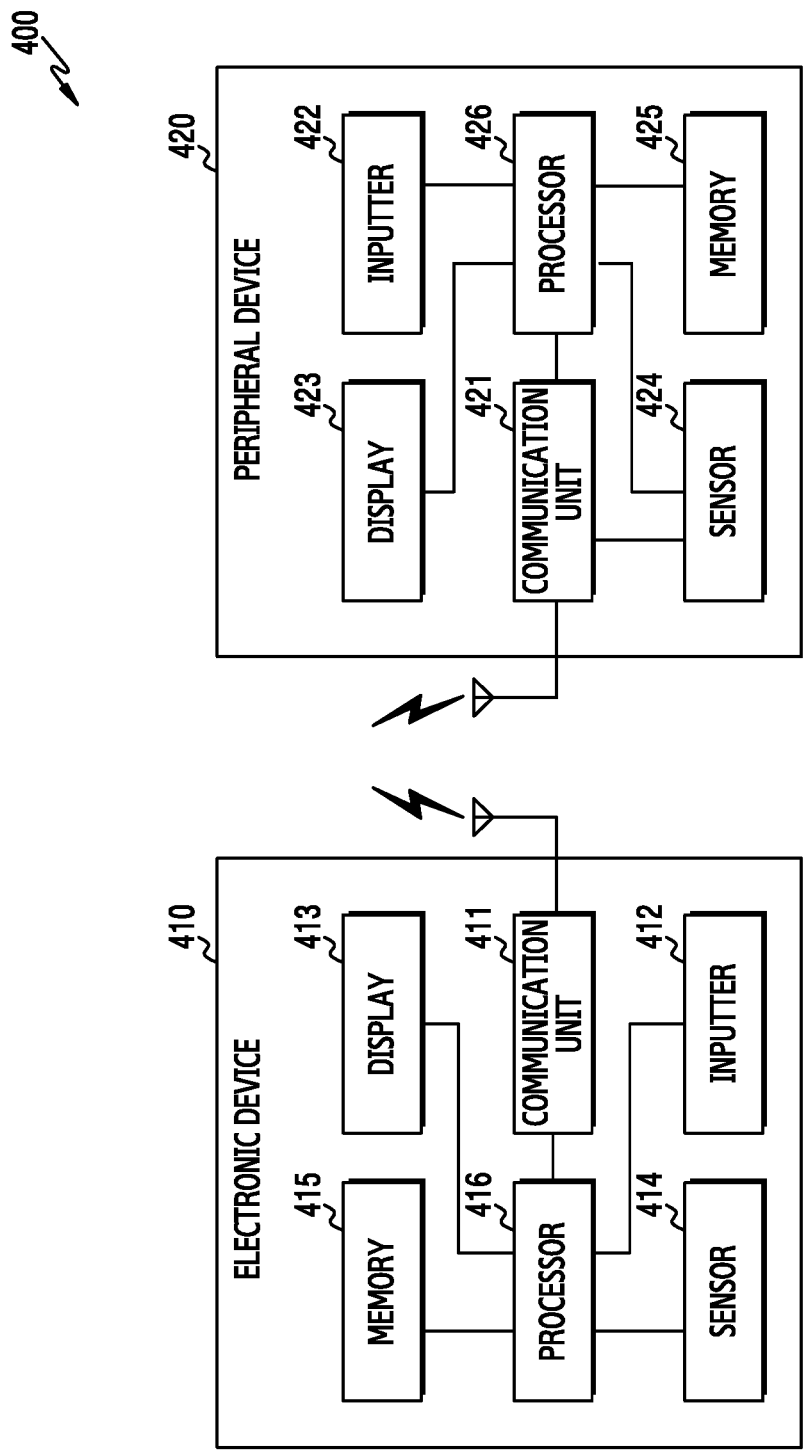
FIG. 4 is a block diagram illustrating an example communication system according to various example embodiments.
Figure 5:
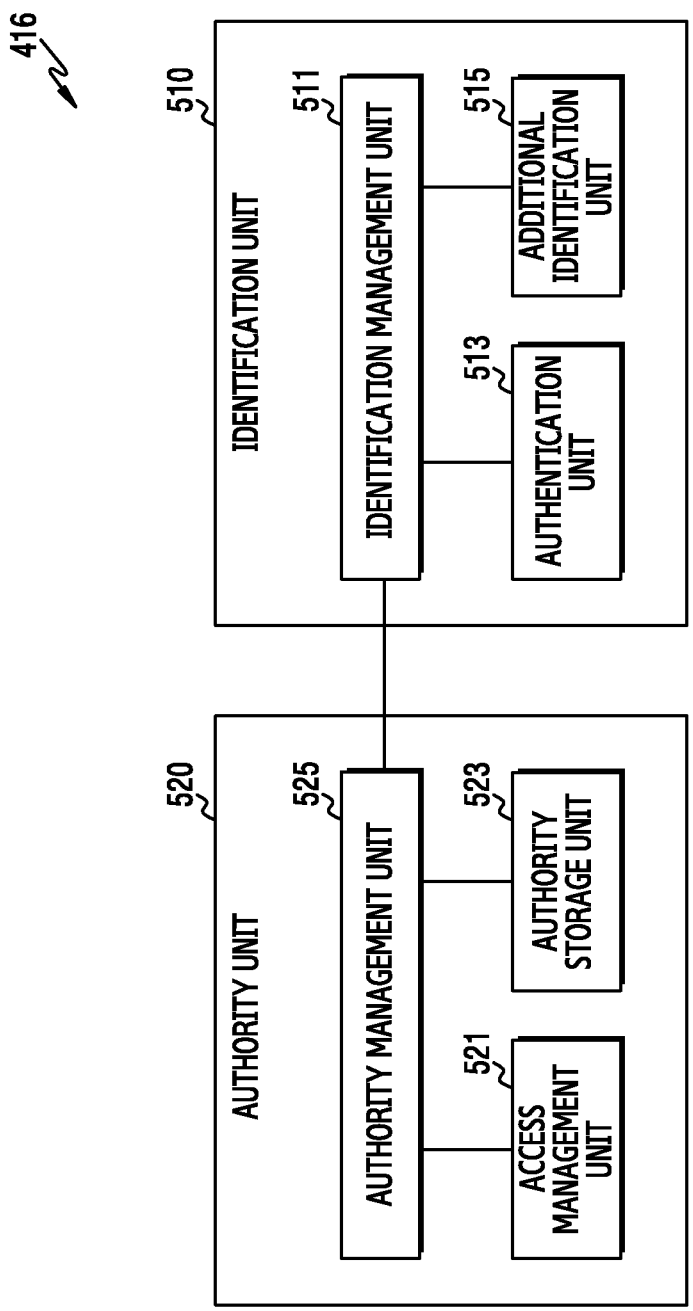
FIG. 5 is a block diagram illustrating an example processor in the electronic device of FIG. 4.

FIG. 4 is a block diagram illustrating an example communication system 400 according to various example embodiments. In addition, FIG. 5 is a block diagram of an example processor 416 in an electronic device 410 of FIG. 4.

Referring to FIG. 4, the communication system 400 according to various example embodiments includes a plurality of electronic devices 410 and 420. For example, the electronic devices 410 and 420 may include an electronic device 410 and a peripheral device 420. The electronic device 410 and the peripheral device 420 may be different types of devices or the same type of device. The electronic device 410 and the peripheral device 420 may connect to and communicate with each other.

The electronic device 410 may be driven in a predetermined location. Alternatively, the electronic device 420 may be driven with mobility. According to various example embodiments, the electronic device 410 may include a communication unit (e.g., including communication circuitry) 411, an inputter (e.g., including input circuitry) 412, a display 413, a sensor 414, a memory 415, and a processor (e.g., including processing circuitry) 416.

The communication unit 411 may communicate in the electronic device 410. In this case, the communication unit 411 may communicate with an external device in various communication methods. For example, the communication unit 411 may communicate in a wire or wireless manner. To achieve this, the communication unit 411 may include various communication circuitry including at least one antenna. In addition, the communication unit 411 may connect to at least one of a mobile communication network or a data communication network. Alternatively, the communication unit 411 may perform short-distance communication. For example, the external device may include at least one of an electronic device, a base station, a server, or a satellite. In addition, the communication method may include long term evolution (LTE), wideband code division multiple access (WCDMA), global system for mobile communications (GSM), wireless fidelity (WiFi), a wireless local area network (LAN), Bluetooth, and near field communications (NFC).

The inputter 412 may generate input data in the electronic device 410. In this case, the inputter 412 may include various input circuitry. For example, the inputter 412 may include various input circuitry, such as, for example, and without limitation, at least one of a key pad, a dome switch, a physical button, a touch panel, or a jog and shuttle.

The display 413 may output display data in the electronic device 410. For example, the display 413 may include a liquid crystal display (LCD), a light emitting diode (LED) display, an organic light emitting diode (OLED) display, an active matrix light emitting diode (AMOLED) display, micro electro mechanical systems (MEMS), and an electronic paper display, or the like, but is not limited thereto. The display 413 may be connected to the inputter 412 and implemented as a touch screen.

The sensor 414 may measure physical quantities in surroundings of the electronic device 410. Alternatively, the sensor 414 may detect the state of the electronic device 410. That is, the sensor 414 may detect a physical signal. In addition, the sensor 414 may convert the physical signal into an electric signal. The sensor 414 may include at least one sensor. For example, the sensor 414 may include at least one of a gesture sensor, a gyro sensor, a barometric pressure sensor, a magnetic sensor, an acceleration sensor, a grip sensor, a proximity sensor, a color sensor (for example, a red, green, blue (RGB) sensor), a biometric sensor, a temperature/humidity sensor, an illuminance sensor, or an ultraviolet (UV) sensor. The biometric sensor may include at least one of an e-nose sensor, an electromyograph (EMG) sensor, an electroencephalogram (EEG) sensor, an electrocardiogram (ECG) sensor, an infrared (IR) sensor, an iris sensor, or a fingerprint sensor.

The memory 415 may store operation programs of the electronic device 410. In addition, the memory 415 may store data which is generated while the programs are being performed. For example, the memory 415 may include at least one of an internal memory or an external memory. The internal memory may include at least one of a volatile memory (for example, a dynamic random access memory (DRAM), a static RAM (SRAM), or a synchronous dynamic RAM (SDRAM)), a nonvolatile memory (for example, a one time programmable read only memory (OTPROM), a programmable ROM (PROM), an erasable programmable ROM (EPROM), an electrically erasable programmable ROM (EEPROM), a mask ROM, and a flash ROM), a flash memory, a hard drive, or a solid state drive (SSD). The external memory may include at least one of a flash drive, a compact flash (CF), secure digital (SD), micro-SD, mini-SD, extreme digital (xD), a multi-media card (MMC), or a memory stick.

According to various example embodiments, the memory 415 may store at least one piece of identification information for determining whether to operate the electronic device 410, and an operation authority corresponding to each piece of identification information. The identification information may include at least one of authentication information, a password, an identification code (PIN code), a pattern, or biometric information. For example, the biometric information may include at least one of odor information, EMG information, brainwave information, ECG information, infrared information, iris information, or fingerprint information. The operation authority may be a function set including at least one function. The operation authority may include at least one of a local authority or a network authority. The local authority may be an authority related to a function which is independently driven in the electronic device 410, and the network authority may be an authority related to a function which is driven in cooperation with an external device. For example, the local authority may be to access a file or a folder, and the network authority may be to share a notification event or relay communication.

The processor 416 may control the overall operation in the electronic device 410. In this case, the processor 416 may perform various functions. To achieve this, the processor 416 may control the components of the electronic device 410. In addition, the processor 416 may receive commands or data from the components of the electronic device 410 and process the commands or data.

According to various example embodiments, the processor 416 may register at least one piece of identification information. To achieve this, the processor 416 may acquire identification information from a user. Alternatively, the processor 416 may acquire identification information from the peripheral device 420. For example, the identification information may include at least one of first identification information acquired from the user or second identification information acquired from the peripheral device 420. The first identification information may include at least one of a password, an identification code (PIN code), a pattern, or biometric information. The second identification information may include authentication information. For example, the authentication information may include at least one of a public key or encrypted random data. In addition, the processor 416 may store an operation authority according to each piece of identification information. The processor 416 may store a first operation authority according to the first identification information and may store a second operation authority according to the second identification information. For example, the first operation authority may include the local authority and the second operation authority may include the network authority and the local authority.

According to various example embodiments, the processor 416 may authenticate a user based on identification information. That is, the processor 416 may detect user's access. In addition, the processor 416 may acquire identification information from one of the user or the peripheral device 420. For example, the processor 416 may acquire the first identification information from the user and authenticate the first identification information. Alternatively, the processor 416 may receive the second identification information from the peripheral device 420 and authenticate the second identification information. By doing so, the processor 416 may set an operation authority according to the identification information. In addition, the processor 416 may operate under the corresponding operation authority.

According to an example embodiment, the processor 416 may include an identification unit 510 and an authority unit 520 as illustrated in FIG. 5. For example, the identification unit 510 and the authority unit 520 may be implemented in the processor 416 at the hardware level. Alternatively, the identification unit 510 and the authority unit 520 may be implemented in the processor 416 at the software level and may be distinguished from each other in the program 140.

The identification unit 510 may include an identification management unit 511, an authentication unit 513, and an additional identification unit 515. The identification management unit 511 may manage at least one piece of identification information. The identification management unit 511 may register identification information. For example, the identification management unit 511 may manage corresponding identification information based on an acquisition method of the identification information. In addition, the identification management unit 511 may match an operation authority with a function according to the identification information. For example, the identification management unit 511 may edit the operation authority according to the identification information. That is, the identification management unit 511 may add, delete, or change at least one function to allow user's access according to the operation authority. The authentication unit 513 may authenticate the identification information. For example, the authentication unit 513 may authenticate the corresponding identification information based on the acquisition method of the identification information. The additional identification unit 515 may acquire another identification information while the processor 416 is operating under a specific operation authority.

The authority unit 520 may include an access management unit 521, an authority storage unit 523, and an authority management unit 525. The access management unit 521 may detect an access request or an end request of the user. According to an example embodiment, when the electronic device 410 is activated, the access management unit 521 may detect the activation of the electronic device 410 as the access request, and, when a request for inactivating the electronic device 410 is generated, the access management unit 521 may detect this request as the end request. According to another example embodiment, when the peripheral device 420 approaching the electronic device 410 is detected, the access management unit 521 may detect the peripheral device 420 approaching the electronic device 410 as the access request or the end request. For example, when a predetermined function is executed in the peripheral device 420, the peripheral device 420 may transmit the access request to the electronic device 410, and, when a predetermined function ends in the peripheral device 420, the peripheral device 420 may transmit the end request to the electronic device 410. Alternatively, when the peripheral device 420 approaches within a predetermined radius of the electronic device 410, the peripheral device 420 may transmit the access request or the end request to the electronic device 410. Alternatively, when another peripheral device (not shown) is carried by a user and approaches within the predetermined radius of the electronic device 410, the peripheral device may transmit the access request or the end request to the electronic device 410. In addition, the access management unit 521 may monitor a change in the state of the electronic device 410. The authority storage unit 523 may store the operation authority according to the identification information. The authority management unit 525 may set an operation authority based on a user's access request. In addition, the authority management unit 525 may remove the setting of the operation authority based on a user's end request. In addition, the authority management unit 525 may manage a setting count for each operation authority.

The peripheral device 420 may be driven with mobility. That is, the peripheral device 420 may be carried and moved by a user. According to various example embodiments, the peripheral device 420 may include a communication unit (e.g., including communication circuitry) 421, an inputter (e.g., including input circuitry) 422, a display 423, a sensor 424, a memory 425, and a processor (e.g., including processing circuitry) 426.

The communication unit 421 may include various communication circuitry to communicate in the peripheral device 420. In this case, the communication unit 421 may communicate with an external device in various communication methods. For example, the communication unit 421 may communicate in a wire or wireless manner. To achieve this, the communication unit 421 may include at least one antenna. In addition, the communication unit 421 may connect to at least one of a mobile communication network or a data communication network. Alternatively, the communication unit 421 may perform short-distance communication. For example, the external device may include at least one of an electronic device, a base station, a server, or a satellite. In addition, the communication method may include LTE, WCDMA, GSM, WiFi, a wireless LAN, Bluetooth, and NFC.

The inputter 422 may include various input circuitry to generate input data in the peripheral device 420. In this case, the inputter 422 may include various input circuitry. For example, the inputter 422 may include input circuitry, such as, for example, and without limitation, at least one of a key pad, a dome switch, a physical button, a touch panel, or a jog and shuttle.

The display 423 may output display data in the peripheral device 420. For example, the display 423 may include an LCD, an LED display, an OLED display, an AMOLED display, MEMS, and an electronic paper display. The display 423 may be connected to the inputter 422 and implemented as a touch screen.

The sensor 424 may measure physical quantities of surroundings of the peripheral device 420. Alternatively, the sensor 424 may detect the state of the peripheral device 420. That is, the sensor 424 may detect a physical signal. In addition, the sensor 424 may convert the physical signal into an electric signal. The sensor 424 may include at least one sensor. For example, the sensor 424 may include at least one of a gesture sensor, a gyro sensor, a barometric pressure sensor, a magnetic sensor, an acceleration sensor, a grip sensor, a proximity sensor, a color sensor, a biometric sensor, a temperature/humidity sensor, an illuminance sensor, or a UV sensor. The biometric sensor may include at least one of an e-nose sensor, an EMG sensor, an EEG sensor, an ECG sensor, an IR sensor, an iris sensor, or a fingerprint sensor.

The memory 425 may store operation programs of the peripheral device 420. In addition, the memory 425 may store data which is generated while the programs are being performed. For example, the memory 425 may include at least one of an internal memory or an external memory. The internal memory may include at least one of a volatile memory (for example, a DRAM, an SRAM, or an SDRAM), a nonvolatile memory (for example, OTPROM, a PROM, an EPROM, an EEPROM, a mask ROM, and a flash ROM), a flash memory, a hard drive, or an SSD. The external memory may include at least one of a flash drive, CF, SD, micro-SD, mini-SD, xD, a MMC, or a memory stick.

According to various example embodiments, the memory 425 may store at least one piece of identification. The identification information may include at least one of a password, an identification code, a pattern, or biometric information. For example, the biometric information may include at least one of odor information, EMG information, brainwave information, ECG information, infrared information, iris information, or fingerprint information.

The processor 426 may control the overall operation in the peripheral device 420. In this case, the processor 426 may perform various functions. To achieve this, the processor 426 may control the components of the peripheral device 420. In addition, the processor 426 may receive commands or data from the components of the peripheral device 420 and process the commands or data.

According to various example embodiments, the processor 426 may acquire identification information from the user. According to an example embodiment, the processor 426 may register the identification information. In addition, the processor 426 may transmit the identification information to the electronic device 410 based on a request of the electronic device 410. According to an example embodiment, the processor 426 may process the identification information and transmit the processed identification information.

According to various example embodiments, the electronic device 410 may include: the memory 415; and the processor 416 functionally connected to the memory 415.

According to various example embodiments, the processor 416 may be configured to: acquire one of a plurality of pieces of identification information which are already registered; set one of a plurality of function sets which are already registered based on the acquired identification information; and allow a user's access according to the set function set.

According to various example embodiments, the processor 416 may further be configured to: detect a user's access; and request the user to input the plurality of pieces of registered identification information.

According to various example embodiments, the electronic device 410 may further include the communication unit 411 functionally connected to the processor 416.

According to various example embodiments, the processor 416 may further be configured to request an input of at least one of the plurality of pieces of registered identification information using the peripheral device 420 wirelessly connected via the communication unit 411.

According to various example embodiments, the electronic device 410 may further include the display 413 functionally connected to the processor 416.

According to various example embodiments, the processor 416 may further be configured to provide a user interface for inputting at least one of the plurality of pieces of registered identification information through the display 413.

According to various example embodiments, the set function set may include a function of operating in cooperation with the peripheral device.

According to various example embodiments, the processor 416 may further be configured to notify a notification event received from the peripheral device 420.

According to various example embodiments, the processor 416 may further be configured to use the peripheral device 420 as a repeater between the electronic device and a communication network.

According to various example embodiments, the processor 416 may further be configured to: detect an end request of the user; and remove the set function set.

According to various example embodiments, the processor 416 may further be configured to: detect the user's access; acquire another of the plurality of pieces of registered identification information; remove the set function set; set another of the plurality of registered function sets based on the another identification information; and allow the user's access according to the another function set.

According to various example embodiments, the processor may further be configured to increase a setting count by 1 according to the set function set, and to reduce a setting count by 1 according to the removed function set.

Figure 6:
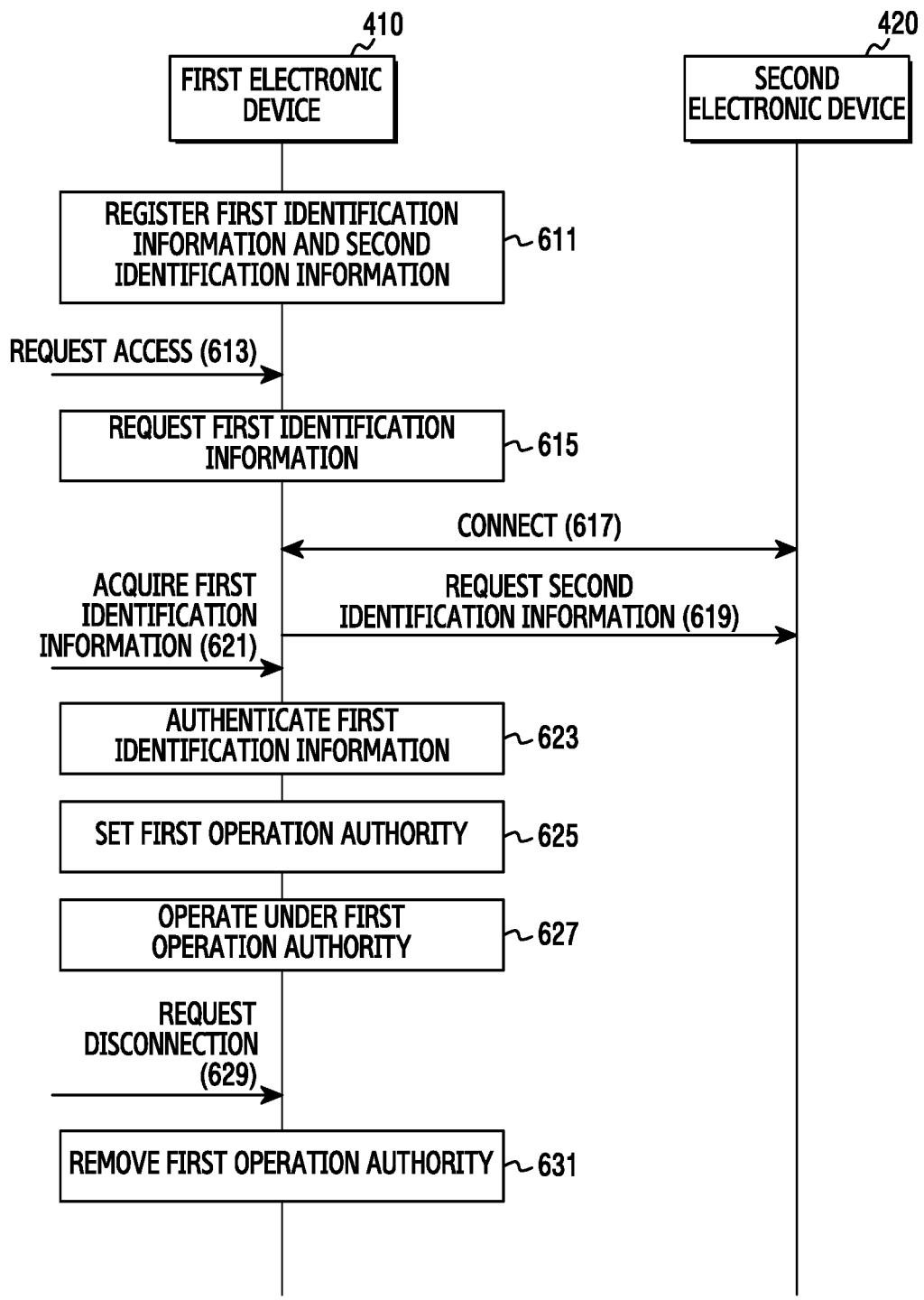
FIG. 6 is a flowchart illustrating an example operating method in the communication system according to various example embodiments.

FIG. 6 is a flowchart illustrating an example operating method in the communication system 400 according to various example embodiments.

Referring to FIG. 6, the electronic device 410 may register first identification information and second identification information in operation 611. The electronic device 410 may acquire the first identification information from the user. In addition, the electronic device 410 may store the first identification information. In this case, the electronic device 410 may store a first operation authority according to the first identification information. Meanwhile, the electronic device 410 may acquire the second identification information from the peripheral device 420. For example, the peripheral device 420 may generate the second identification information and transmit the second identification information to the electronic device 410. In addition, the electronic device 410 may store the second identification information. For example, the peripheral device 420 may generate a pair of a private key and a public key, and may store the private key and transmit the public key to the electronic device 410. By doing so, the electronic device 410 may store the public key as the second identification information. In this case, the electronic device 410 may store a second operation authority according to the second identification information. For example, the first operation authority may include a local authority and the second operation authority may include a network authority and a local authority.

According to various example embodiments, the electronic device 410 may detect a request for access to the electronic device 410 in operation 613. That is, when an access request is generated from the user, the electronic device 410 may detect the access request. According to an example embodiment, when the electronic device 410 is activated, the electronic device 410 may detect the activation of the electronic device 410 as the access request. For example, the electronic device 410 may be activated in response to the electronic device 410 being booted or woken up. According to another example embodiment, when the peripheral device 420 approaching the electronic device 410 is detected, the electronic device 410 may detect the peripheral device 420 approaching the electronic device 410 as the access request. For example, when a predetermined function is executed in the peripheral device 420, the peripheral device 420 may transmit the access request to the electronic device 410. Alternatively, when the peripheral device 420 approaches within a predetermined radius of the electronic device 410, the peripheral device 420 may transmit the access request to the electronic device 410. Alternatively, when another peripheral device (not shown) is carried by a user and approaches within the predetermined radius of the electronic device 410, the peripheral device may transmit an access request to the electronic device 410.

According to various example embodiments, when the request for access to the electronic device 410 is detected in operation 613, the electronic device 410 may request first identification information from the user in operation 615. For example, the electronic device 410 may request the first identification information from the user using display data or audio data. According to an example embodiment, the electronic device 410 may provide a user interface to acquire the first identification information. According to another example embodiment, the electronic device 410 may activate at least one sensor (for example, a biometric sensor or the like).

According to various example embodiments, when the request for access to the electronic device 410 is detected in operation 613, the electronic device 410 may connect to the peripheral device 420 in operation 617. The electronic device 410 may connect to the peripheral device 420 in a predetermined communication method, for example, in a short-distance communication method. For example, the electronic device 410 may request a connection to the peripheral device 420. In response to this request, the peripheral device 420 may connect to the electronic device 410. By doing so, the electronic device 410 and the peripheral device 420 may be connected with each other. In addition, the electronic device 410 may request second identification information from the peripheral device 420 in operation 619. To achieve this, the electronic device 410 may generate random data. In addition, the electronic device 410 may encrypt the random data using the pre-stored public key, thereby generating the encrypted data. By doing so, the electronic device 410 may transmit the encrypted data to the peripheral device 420.

According to various example embodiments, the electronic device 410 may acquire the first identification information in operation 621. According to an example embodiment, the electronic device 410 may acquire the first identification information through the user interface. According to another example embodiment, the electronic device 410 may acquire the first identification information through at least one sensor (for example, a biometric sensor or the like). In addition, the electronic device 410 may authenticate the first identification information in operation 623. The electronic device 410 may compare the first identification information and the first identification information which has been already registered in operation 611.

According to various example embodiments, the electronic device 410 may set a first operation authority based on the first identification information in operation 625. That is, when the electronic device 410 succeeds in authenticating the first identification information, the electronic device 410 may set a session for a logic connection between the user and the electronic device 410. In this case, the electronic device 410 may generate an ID of the corresponding session. In addition, the electronic device 410 may detect the first operation authority according to the first identification information and may set the first operation authority for the corresponding session.

According to various example embodiments, the electronic device 410 may operate under the first operation authority in operation 627. That is, the electronic device 410 may allow user's access to functions corresponding to the first operation authority and may block user's access to the other functions. For example, when the first operation authority includes the local authority, the electronic device 410 may allow access to a file or a folder.

According to various example embodiments, the electronic device 410 may detect an end request on the electronic device 410 in operation 629 while operating under the first operation authority in operation 627. That is, when an end request is generated from the user, the electronic device 410 may detect this request. According to an example embodiment, when a request for inactivating the electronic device 410 is generated, the electronic device 410 may detect this request as the end request. According to another example embodiment, when the peripheral device 420 approaching the electronic device 410 is detected, the electronic device 410 may detect the peripheral device 420 approaching the electronic device 410 as the end request. For example, when a predetermined function is ended in the peripheral device 420, the peripheral device 420 may transmit the end request to the electronic device 410. Alternatively, when the peripheral device 420 approaches within a predetermined radius of the electronic device 410, the peripheral device 420 may transmit the end request to the electronic device 410. Alternatively, when another peripheral device (not shown) is carried by a user and approaches within the predetermined radius of the electronic device 410, the peripheral device may transmit the end request to the electronic device 410.

According to various example embodiments, when the end request on the electronic device 410 is detected in operation 629, the electronic device 410 may remove the setting of the first operation authority in operation 631. In addition, the electronic device 410 may block the user's access to the electronic device 410 and may end the session.

Figure 7:
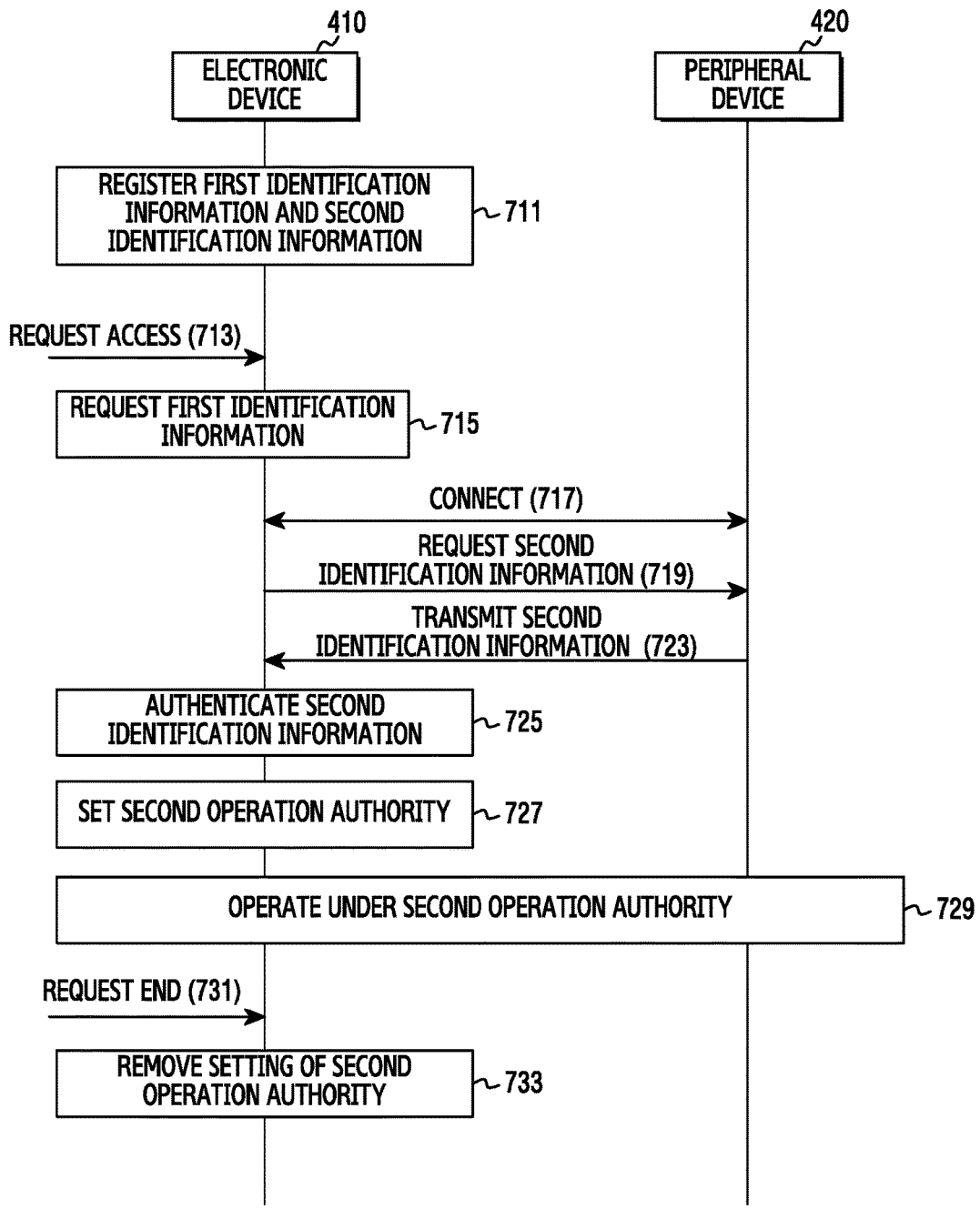
FIG. 7 is a flowchart illustrating an example operating method in the communication system according to various example embodiments.
Figure 8A:
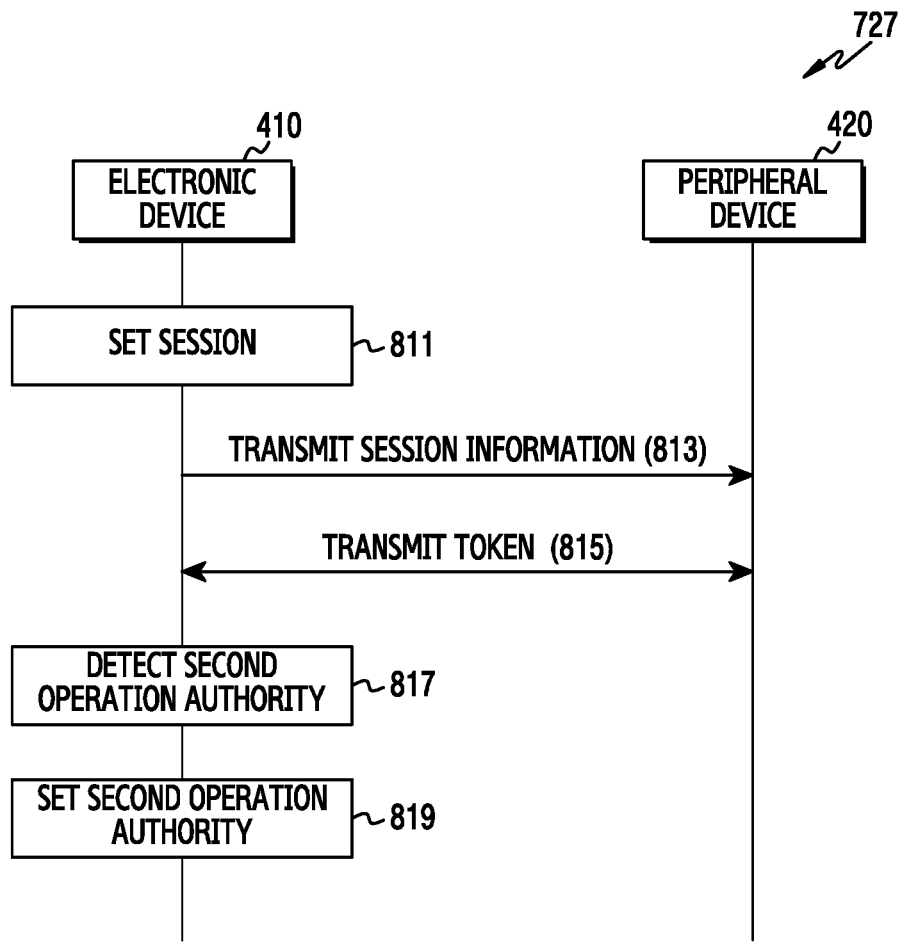
FIG. 8A is a flowchart illustrating an example operation of setting a second operation authority in FIG. 7.
Figure 8B:
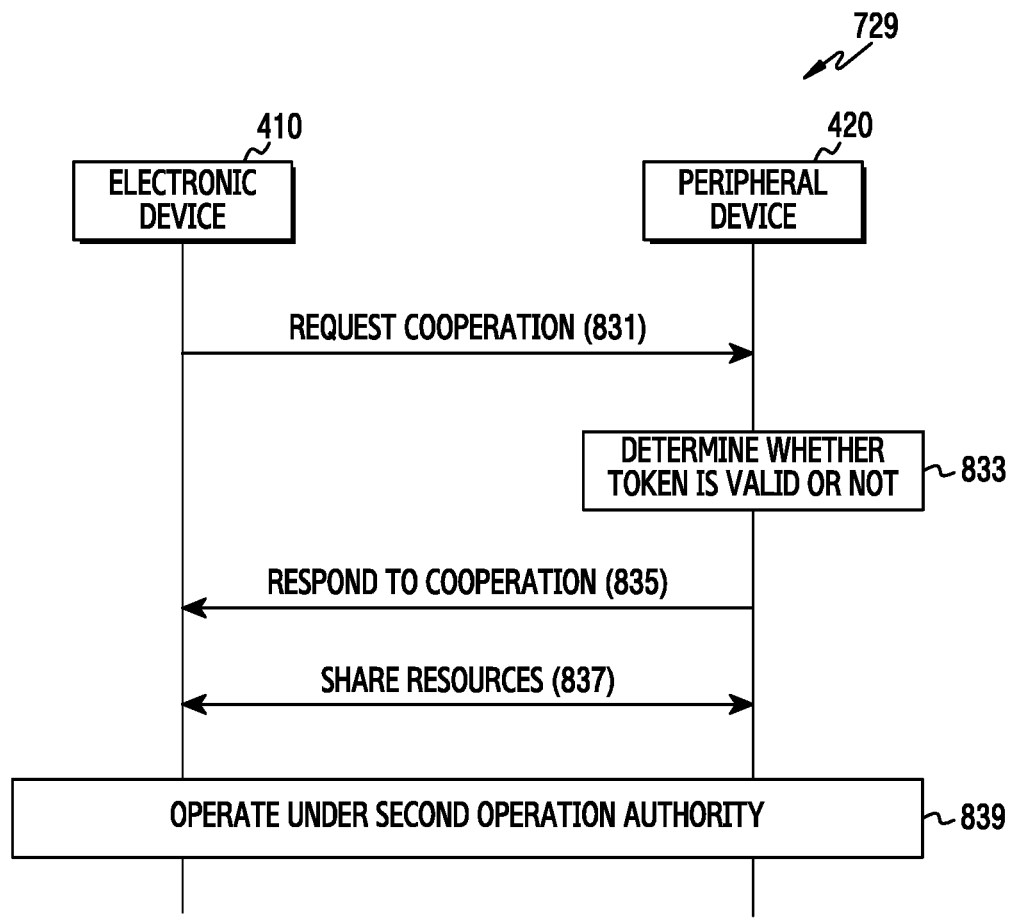
FIG. 8B is a flowchart illustrating an example operation of operating under the second operation authority in FIG. 7.

FIG. 7 is a flowchart illustrating an example operating method in the communication system 400 according to various example embodiments. FIG. 8A is a flowchart illustrating the example operation of setting a second operation authority in FIG. 7. FIG. 8B is a flowchart illustrating the example operation of operating under the second operation authority in FIG. 7.

Referring to FIG. 7, the electronic device 410 may register first identification information and second identification information in operation 711. The electronic device 410 may acquire the first identification information from the user. In addition, the electronic device 410 may store the first identification information. In this case, the electronic device 410 may store a first operation authority according to the first identification information. Meanwhile, the electronic device 410 may acquire the second identification information from the peripheral device 420. For example, the peripheral device 420 may generate the second identification information and transmit the second identification information to the electronic device 410. In addition, the electronic device 410 may store the second identification information. For example, the peripheral device 420 may generate a pair of a private key and a public key, and may store the private key and transmit the public key to the electronic device 410. By doing so, the electronic device 410 may store the public key as the second identification information. In this case, the electronic device 410 may store a second operation authority according to the second identification information. For example, the first operation authority may include a local authority and the second operation authority may include a network authority and a local authority.

According to various example embodiments, the electronic device 410 may detect a request for access to the electronic device 410 in operation 713. That is, when an access request is generated from the user, the electronic device 410 may detect the access request. According to an example embodiment, when the electronic device 410 is activated, the electronic device 410 may detect the activation of the electronic device 410 as the access request. For example, the electronic device 410 may be activated in response to the electronic device 410 being booted or woken up. According to another example embodiment, when the peripheral device 420 approaching the electronic device 410 is detected, the electronic device 410 may detect the peripheral device 420 approaching the electronic device 410 as the access request. For example, when a predetermined function is executed in the peripheral device 420, the peripheral device 420 may transmit the access request to the electronic device 410. Alternatively, when the peripheral device 420 approaches within a predetermined radius of the electronic device 410, the peripheral device 420 may transmit the access request to the electronic device 410. Alternatively, when another peripheral device (not shown) is carried by a user and approaches within the predetermined radius of the electronic device 410, the peripheral device may transmit an access request to the electronic device 410.

According to various example embodiments, when the request for access to the electronic device 410 is detected in operation 713, the electronic device 410 may request first identification information from the user in operation 715. For example, the electronic device 410 may request the first identification information from the user using display data or audio data. According to an example embodiment, the electronic device 410 may provide a user interface to acquire the first identification information. According to another example embodiment, the electronic device 410 may activate a biometric sensor.

According to various example embodiments, when the request for access to the electronic device 410 is detected in operation 713, the electronic device 410 may connect to the peripheral device 420 in operation 717. The electronic device 410 may connect to the peripheral device 420 in a predetermined communication method, for example, in a short-distance communication method. For example, the electronic device 410 may request a connection to the peripheral device 420. In response to this request, the peripheral device 420 may connect to the electronic device 410. By doing so, the electronic device 410 and the peripheral device 420 may be connected with each other. In addition, the electronic device 410 may request second identification information from the peripheral device 420 in operation 719. In this case, the peripheral device 420 may request the second identification information from the user. For example, the peripheral device 420 may request the second identification information from the user using display data or audio data. To achieve this, the electronic device 410 may generate random data. In addition, the electronic device 410 may encrypt the random data using the pre-stored public key, thereby generating the encrypted data. By doing so, the electronic device 410 may transmit the encrypted data to the peripheral device 420.

According to various example embodiments, when the second identification information is received from the peripheral device 420 in operation 723, the electronic device 410 may authenticate the second identification information in operation 725. The electronic device 410 may compare the second identification information and the second identification information which has been already registered in operation 711. For example, when the encrypted data is received from the electronic device 410, the peripheral device 420 may detect the random data by decrypting the encrypted data using the pre-stored private key. In addition, the peripheral device 420 may independently authenticate the user. When the peripheral device 420 succeeds in authenticating the user by doing so, the peripheral device 420 may encrypt the random data using the private key, thereby generating authentication data. In addition, the peripheral device 420 may transmit the authentication data to the electronic device 410. Meanwhile, when the authentication data is received, the electronic device 410 may detect the random data by decrypting the authentication data using the public key. In addition, the electronic device 410 may compare the random data of the encrypted data and the authentication data of the authentication data. Accordingly, when the random data of the encrypted data is consistent with the authentication data of the authentication data, the electronic device 410 may determine that the electronic device 410 succeeds in authenticating. On the other hand, when the random data of the encrypted data is different from the authentication data of the authentication data, the electronic device 410 may determine that the electronic device 410 fails to authenticate.

According to various example embodiments, the electronic device 410 may set a second operation authority based on the second identification information in operation 727. For example, when the electronic device 410 succeeds in authenticating the second identification information, the electronic device 410 may set the second operation authority as illustrated in FIG. 8A. The electronic device 410 may set a session for a logic connection between the user and the electronic device 410 in operation 811. In this case, the electronic device 410 may generate session information. In addition, the electronic device 410 may transmit the session information to the peripheral device 420 in operation 813. When the session information is received from the electronic device 410, the peripheral device 420 may transmit a predetermined token to the electronic device 410 in operation 815. In addition, the electronic device 410 may detect the second operation authority according to the second identification information in operation 817. By doing so, the electronic device 410 may set the second operation authority for the corresponding session in operation 819.

According to various example embodiments, the electronic device 410 may operate under the second operation authority in operation 729. For example, the electronic device 410 may operate under the second operation authority as illustrated in FIG. 8B. The electronic device 410 may request cooperation from the peripheral device 420 in operation 831. In this case, the electronic device 410 may forward the session information and the token received from the peripheral device 420 to the peripheral device 420. When the session information and the token are received from the electronic device 410, the peripheral device 420 may determine whether the token is valid or not based on the session information and the token in operation 833. When it is determined that the token is valid, the peripheral device 420 may transmit a response to the cooperation to the electronic device 410 in operation 835. When the response to the cooperation is received from the peripheral device 420, the electronic device 410 may share resources for the cooperation with the peripheral device 420 in operation 837. By doing so, the electronic device 410 may cooperate with the peripheral device 420 based on the resources, such that the electronic device 410 operates under the second operation authority in operation 839.

That is, the electronic device 410 may allow user's access to functions corresponding to the second operation authority, and block user's access to the other functions. For example, when the second operation authority includes a local authority and a network authority, the electronic device 410 may allow access to a file or a folder and also may allow sharing a notification event or relaying communication in cooperation with the peripheral device 420. When a notification event occurs in the peripheral device 420, the peripheral device 420 may share the notification event with the electronic device 410. By doing so, the electronic device 410 may notify the user of the notification event using at least one of display data or audio data. In addition, the peripheral device 420 may provide communication relay between the electronic device 410 and a communication network. By doing so, the electronic device 410 may communicate with the communication network using the peripheral device 420.

According to various example embodiments, the electronic device 410 may detect an end request on the electronic device 410 in operation 731 while operating under the second operation authority in operation 729. That is, when an end request is generated from the user, the electronic device 410 may detect this request. According to an example embodiment, when a request for inactivating the electronic device 410 is generated, the electronic device 410 may detect this request as the end request. According to another example embodiment, when the peripheral device 420 approaching the electronic device 410 is detected, the electronic device 410 may detect the peripheral device 420 approaching the electronic device 410 as the end request. For example, when a predetermined function is ended in the peripheral device 420, the peripheral device 420 may transmit the end request to the electronic device 410. Alternatively, when the peripheral device 420 approaches within a predetermined radius of the electronic device 410, the peripheral device 420 may transmit the end request to the electronic device 410. Alternatively, when another peripheral device (not shown) is carried by a user and approaches within the predetermined radius of the electronic device 410, the peripheral device may transmit the end request to the electronic device 410.

According to various example embodiments, when the end request on the electronic device 410 is detected in operation 731, the electronic device 410 may remove the setting of the second operation authority in operation 733. In addition, the electronic device 410 may block the user's access to the electronic device 410 and may end the session. In this case, the electronic device 410 may notify the peripheral device 420 that the session is ended. In response to this, the peripheral device 420 may destroy the session information and the token and stop sharing the resources. In addition, the peripheral device 420 may notify the electronic device 410 of the destruction of the session information and the token and the stopping of the sharing of the resources.

Figure 9:
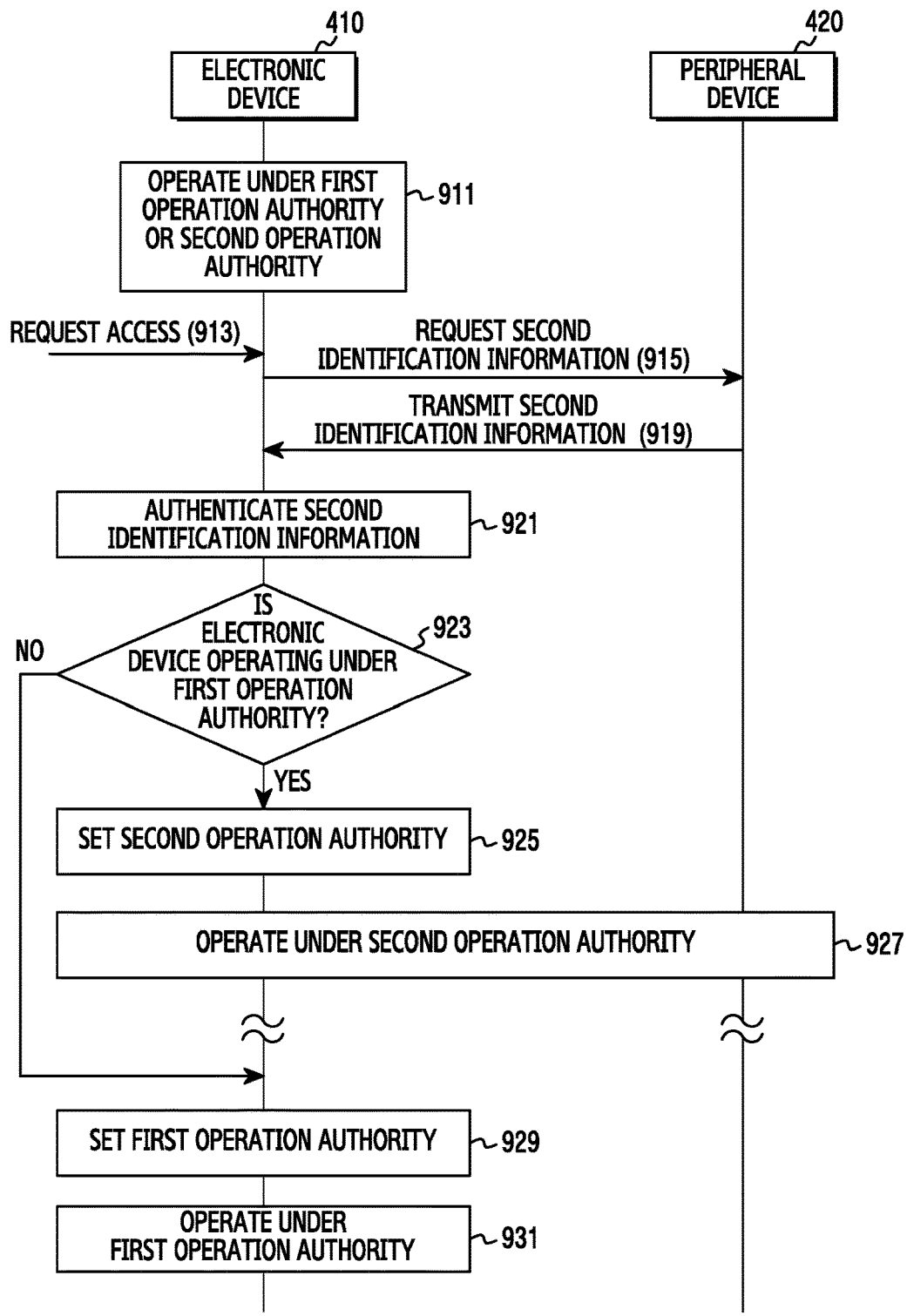
FIG. 9 is a flowchart illustrating an example operating method in the communication system according to various example embodiments.

FIG. 9 is a flowchart illustrating an example operating method in the communication system 400 according to various example embodiments.

Referring to FIG. 9, the electronic device 410 may operate under one of the first operation authority or the second operation authority in operation 911. The electronic device 410 may set the first operation authority and operate under the first operation authority.

According to an example embodiment, the electronic device 410 may set a setting count of the first operation authority to 1 and set a setting count of the second operation authority to 0. Alternatively, the electronic device 410 may set the second operation authority and operate under the second operation authority. According to an example embodiment, the electronic device 410 may set the setting count of the first operation authority to 0 and set the setting count of the second operation authority to 1.

According to various example embodiments, the electronic device 410 may detect a request for access to the electronic device 410 in operation 913. That is, when an access request is generated from the user, the electronic device 410 may detect the access request. According to an example embodiment, when the electronic device 410 is activated, the electronic device 410 may detect the activation of the electronic device 410 as the access request. According to another example embodiment, when the peripheral device 420 approaching the electronic device 410 is detected, the electronic device 410 may detect the peripheral device 420 approaching the electronic device 410 as the access request. For example, when a predetermined function is executed in the peripheral device 420, the peripheral device 420 may transmit the access request to the electronic device 410. Alternatively, when the peripheral device 420 approaches within a predetermined radius of the electronic device 410, the peripheral device 420 may transmit the access request to the electronic device 410. Alternatively, when another peripheral device (not shown) is carried by a user and approaches within the predetermined radius of the electronic device 410, the peripheral device may transmit an access request to the electronic device 410.

According to various example embodiments, when the request for access to the electronic device 410 is detected in operation 913, the electronic device 410 may request second identification information from the peripheral device 420 in operation 915. In this case, the peripheral device 420 may request the second identification information from the user. For example, the peripheral device 420 may request the second identification information from the user using display data or audio data. To achieve this, the electronic device 410 may generate random data. In addition, the electronic device 410 may encrypt the random data using a pre-stored public key, thereby generating the encrypted data. By doing so, the electronic device 410 may transmit the encrypted data to the peripheral device 420.

According to various example embodiments, when the second identification information is received from the peripheral device 420 in operation 919, the electronic device 410 may authenticate the second identification information in operation 921. The electronic device 410 may compare the second identification information and second identification information which has been already registered. For example, when the encrypted data is received from the electronic device 410, the peripheral device 420 may detect the random data by decrypting the encrypted data using a pre-stored private key. In addition, the peripheral device 420 may independently authenticate the user. When the peripheral device 420 succeeds in authenticating the user by doing so, the peripheral device 420 may encrypt the random data using the private key, thereby generating authentication data. In addition, the peripheral device 420 may transmit the authentication data to the electronic device 410. Meanwhile, when the authentication data is received, the electronic device 410 may detect the random data by decrypting the authentication data using the public key. In addition, the electronic device 410 may compare the random data of the encrypted data and the authentication data of the authentication data. Accordingly, when the random data of the encrypted data is consistent with the authentication data of the authentication data, the electronic device 410 may determine that the electronic device 410 succeeds in authenticating. On the other hand, when the random data of the encrypted data is different from the authentication data of the authentication data, the electronic device 410 may determine that the electronic device 410 fails to authenticate.

According to various example embodiments, the electronic device 410 may determine whether the electronic device 410 is operating under the first operation authority or not in operation 923. In other words, the electronic device 410 may determine whether the electronic device 410 is operating under the second operation authority or not.

According to an example embodiment, the electronic device 410 may identify the setting count of the first operation authority and the setting count of the second operation authority. In addition, when the setting count of the first operation authority is 1 and the setting count of the second operation authority is 0, the electronic device 410 may determine that the electronic device 410 is operating under the first operation authority. In addition, when the setting count of the first operation authority is 0 and the setting count of the second operation authority is 1, the electronic device 410 may determine that the electronic device 410 is operating under the second operation authority.

According to various example embodiments, when it is determined that the electronic device 410 is operating under the first operation authority in operation 923, the electronic device 410 may set the second operation authority based on the second identification information in operation 925. For example, the electronic device 410 may set the second operation authority as illustrated in FIG. 8A. The electronic device 410 may set a session for a logic connection between the user and the electronic device 410 in operation 811. In this case, the electronic device 410 may generate session information. In addition, the electronic device 410 may transmit the session information to the peripheral device 420 in operation 813. When the session information is received from the electronic device 410, the peripheral device 420 may transmit a predetermined token to the electronic device 410 in operation 815. In addition, the electronic device 410 may detect the second operation authority according to the second identification information in operation 817. By doing so, the electronic device 410 may set the second operation authority for the corresponding session in operation 819.

According to an example embodiment, the electronic device 410 may change the setting count of the first operation authority to 0 and change the setting count of the second operation authority to 1. To achieve this, the electronic device 410 may reduce the setting count of the first operation authority by 1 and increase the setting count of the second operation authority by 1. In addition, the electronic device 410 may remove the setting of the first operation authority and may set the second operation authority. By doing so, the electronic device 410 may change the setting from the first operation authority to the second operation authority.

According to various example embodiments, the electronic device 410 may operate under the second operation authority in operation 927. For example, the electronic device 410 may operate under the second operation authority as illustrated in FIG. 8B. The electronic device 410 may request cooperation from the peripheral device 420 in operation 831. In this case, the electronic device 410 may forward the session information on the current session and the token received from the peripheral device 420 to the peripheral device 420. When the session information and the token are received from the electronic device 410, the peripheral device 420 may determine whether the token is valid or not based on the session information and the token in operation 833. When it is determined that the token is valid, the peripheral device 420 may transmit a response to the cooperation to the electronic device 410 in operation 835. When the response to the cooperation is received from the peripheral device 420, the electronic device 410 may share resources for the cooperation with the peripheral device 420 in operation 837. By doing so, the electronic device 410 may cooperate with the peripheral device 420 based on the resources, such that the electronic device 410 operates under the second operation authority in operation 839.

That is, the electronic device 410 may allow user's access to functions corresponding to the second operation authority, and block user's access to the other functions. For example, when the second operation authority includes a local authority and a network authority, the electronic device 410 may allow access to a file or a folder and also may allow sharing a notification event or relaying communication in cooperation with the peripheral device 420. When a notification event occurs in the peripheral device 420, the peripheral device 420 may share the notification event with the electronic device 410. By doing so, the electronic device 410 may notify the user of the notification event using at least one of display data or audio data. In addition, the peripheral device 420 may provide communication relay between the electronic device 410 and a communication network. By doing so, the electronic device 410 may communicate with the communication network using the peripheral device 420.

According to various example embodiments, when it is determined that the electronic device 410 is operating under the second operation authority in operation 923, the electronic device 410 may set the first operation authority based on the first identification information in operation 929. According to an example embodiment, the electronic device 410 may change the setting count of the first operation authority to 1 and change the setting count of the second operation authority to 0. To achieve this, the electronic device 410 may increase the setting count of the first operation authority by 1 and reduce the setting count of the second operation authority by 1. In addition, the electronic device 410 may remove the setting of the second operation authority and set the first operation authority. By doing so, the electronic device 410 may change the setting from the second operation authority to the first operation authority.

According to various example embodiments, the electronic device 410 may operate under the first operation authority in operation 931. That is, the electronic device 410 may allow user's access to functions corresponding to the first operation authority and block user's access to the other functions. For example, when the first operation authority includes a local authority, the electronic device 410 may allow access to a file or a folder.

Figure 10:
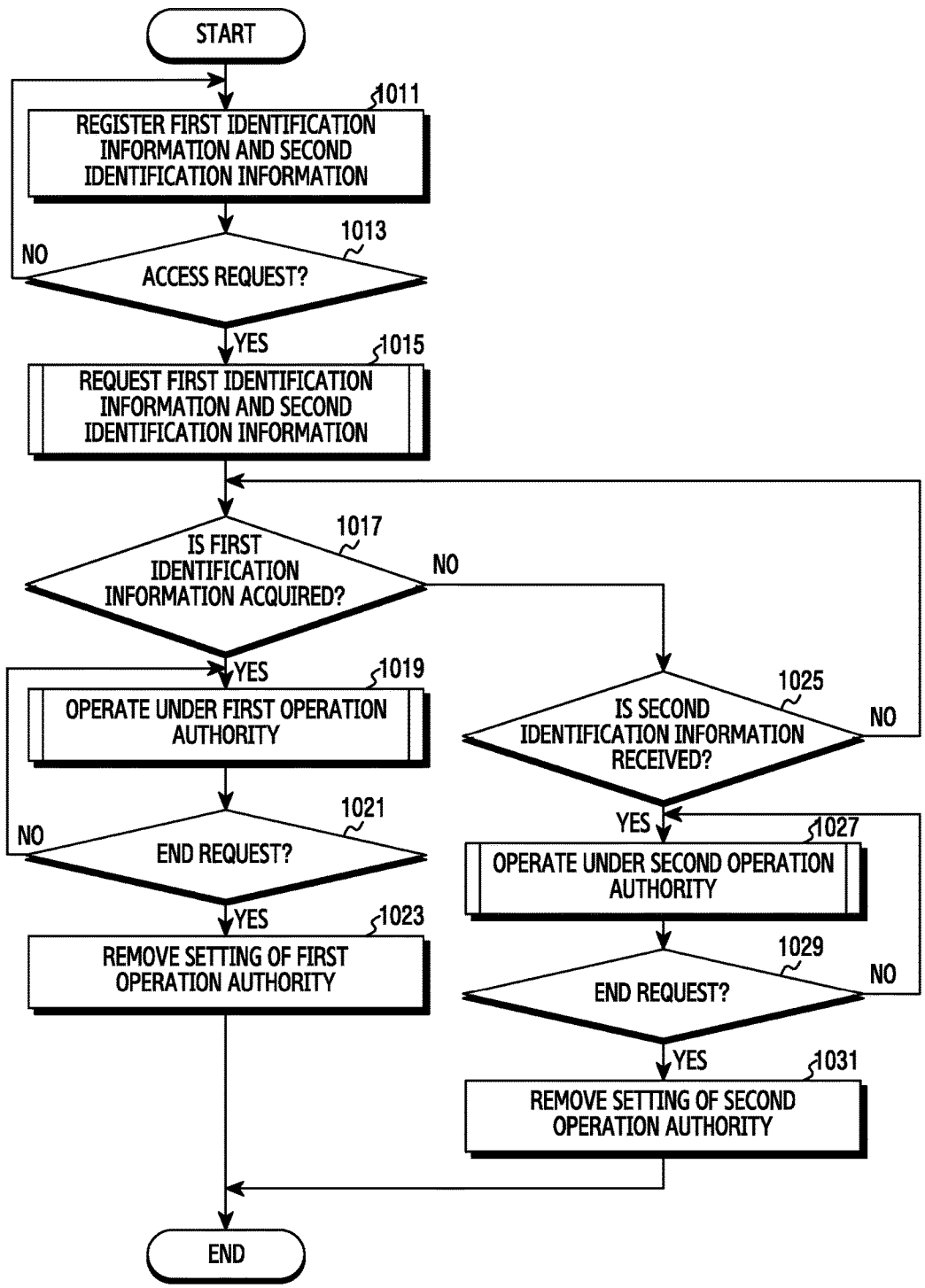
FIG. 10 is a flowchart illustrating an example operating method of an electronic device according to various example embodiments.

FIG. 10 is a flowchart illustrating an example operating method of the electronic device 410 according to various example embodiments.

Referring to FIG. 10, the processor 416 may register first identification information and second identification information in operation 1011. The processor 416 may acquire the first identification information from the user. In addition, the processor 416 may store the first identification information. In this case, the processor 416 may store a first operation authority according to the first identification information. Meanwhile, the processor 416 may acquire the second identification information from the peripheral device 420. For example, the second identification information may be acquired from the peripheral device 420 and may be transmitted without being converted or may be converted and transmitted. In addition, the processor 416 may store the second identification information. In this case, the processor 416 may store a second operation authority according to the second identification information. For example, the first operation authority may include a local authority and the second operation authority may include a network authority and a local authority.

According to various example embodiments, when an access request is generated from the user, the processor 416 may detect the access request in operation 1013. According to an example embodiment, when the electronic device 410 is activated, the processor 416 may detect the activation of the electronic device 410 as the access request. For example, the electronic device 410 may be activated in response to the electronic device 410 being booted or woken up. According to another example embodiment, when the peripheral device 420 approaching the electronic device 410 is detected, the processor 416 may detect the peripheral device 420 approaching the electronic device 410 as the access request. In addition, the processor 416 may request first identification information and second identification information in operation 1015. That is, the processor 416 may request the first identification information from the user and may request the second identification information from the peripheral device 420.

Figure 11:
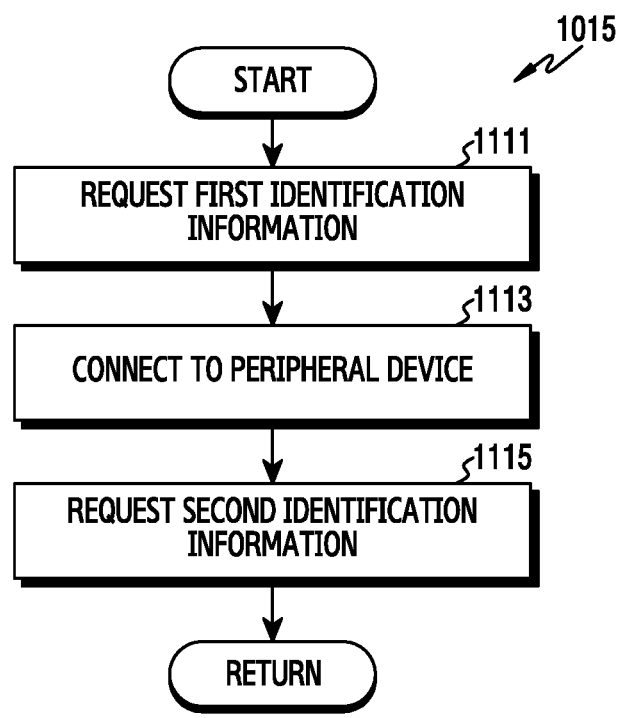
FIG. 11 is a flowchart of an operation of requesting first identification information and second identification information in FIG. 10.

FIG. 11 is a flowchart illustrating an example operation of requesting the first identification information and the second identification information in FIG. 10.

Referring to FIG. 11, the processor 416 may request the first identification information from the user in operation 1111. For example, the processor 416 may request the first identification information from the user using display data or audio data. According to an example embodiment, the processor 416 may provide a user interface to acquire the first identification information. According to another example embodiment, the processor 416 may activate the biometric sensor of the sensor 414.

According to various example embodiments, the processor 416 may connect to the peripheral device 420 in operation 1113. The processor 416 may connect to the peripheral device 420 in a predetermined communication method, for example, in a short-distance communication method. In addition, the processor 416 may request the second identification information from the peripheral device 420 in operation 1115. In this case, the peripheral device 420 may request the second identification information from the user. Thereafter, the processor 416 may return to FIG. 10.

According to various example embodiments, the processor 416 may determine whether the first identification information is acquired or not in operation 1017. According to an example embodiment, the processor 416 may acquire the first identification information through the user interface. According to another example embodiment, the processor 416 may acquire the first identification information through the biometric sensor of the sensor 414.

According to various example embodiments, when it is determined that the first identification information is acquired in operation 1017, the processor 416 may operate under the first operation authority according to the first identification information in operation 1019. That is, the processor 416 may set a session for a logic connection between the user and the electronic device 410. In addition, the processor 416 may allow user's access to the electronic device 410 based on the first operation authority.

Figure 12:
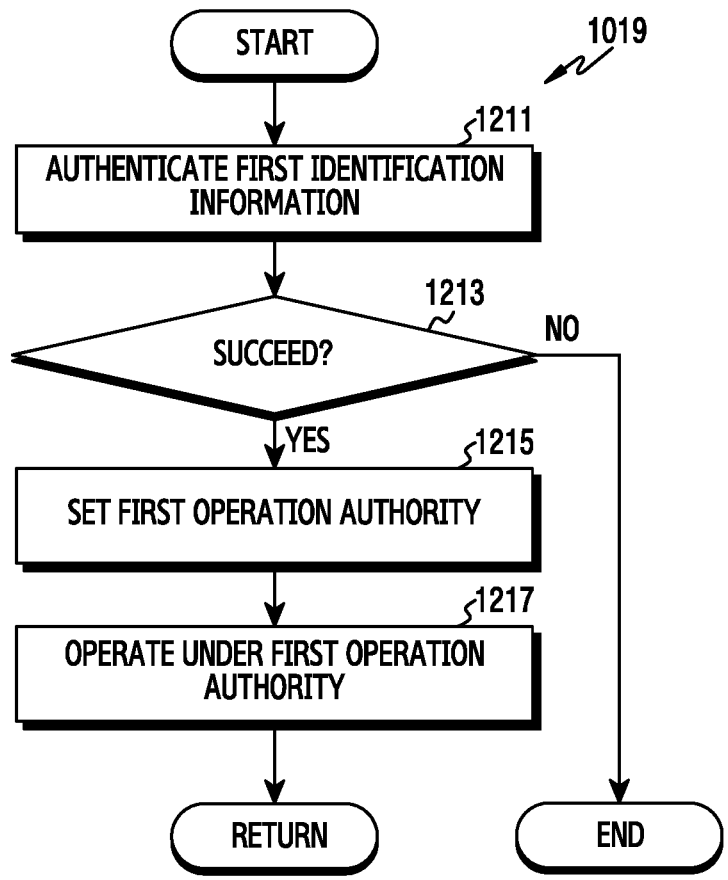
FIG. 12 is a flowchart illustrating an example operation of operating under a first operation authority in FIG. 10.

FIG. 12 is a flowchart illustrating an example operation of operating under the first operation authority in FIG. 10.

Referring to FIG. 12, the processor 416 may authenticate the first identification information in operation 1211. The electronic device 410 may compare the first identification information and the first identification information which has been already registered in operation 911. In addition, the processor 416 may determine whether the electronic device 410 succeeds in authenticating the first identification information in operation 1213. According to an example embodiment, when the first identification information is the same as the already registered first identification information, the processor 416 may determine that the electronic device 410 succeeds in authenticating the first identification information. On the other hand, when the first identification information is different from the already registered first identification information, the processor 416 may determine that the electronic device 410 fails to authenticate the first identification information.

According to various example embodiments, when it is determined that the electronic device 410 succeeds in authenticating the first identification information in operation 1213, the processor 416 may set the first operation authority based on the first identification information in operation 1215. That is, the processor 416 may set the session for the logic connection between the user and the electronic device 410. In this case, the processor 416 may generate an ID of the corresponding session. In addition, the processor 416 may detect the first operation authority according to the first identification information and set the first operation authority for the corresponding session.

In addition, the processor 416 may operate under the first operation authority in operation 1217. That is, the processor 416 may allow user's access to functions corresponding to the first operation authority, and may block user's access to the other functions. For example, when the first operation authority includes a local authority, the processor 416 may allow access to a file or folder. Thereafter, the processor 416 may return to FIG. 10.

According to various example embodiments, when it is determined that the electronic device 410 fails to authenticate the first identification information in operation 1213, the processor 416 may disregard the user's access request.

According to various example embodiments, when an end request is generated from the user while the electronic device 410 is operating under the first operation authority in operation 1019, the processor 416 may detect the end request in operation 1021. According to an example embodiment, when a request for inactivating the electronic device 410 is generated, the processor 416 may detect this request as the end request. According to another example embodiment, when the peripheral device 420 approaching the electronic device 410 is detected, the processor 416 may detect the peripheral device 420 approaching the electronic device 410 as the end request. In addition, the processor 416 may remove the setting of the first operation authority in operation 1023. In this case, the processor 416 may block user's access to the electronic device 410 and may end the session.

According to various example embodiments, when the first identification information is not acquired in operation 1017 and the second identification information is received from the peripheral device 420, the processor 416 may detect whether the second identification information is received in operation 1025. For example, the second identification information may be acquired from the peripheral device 420, and may be transmitted without being converted and may be converted and transmitted. In addition, the processor 416 may operate under the second operation authority in operation 1027. That is, the processor 416 may operate under the second operation authority according to the second identification information.

Figure 13:
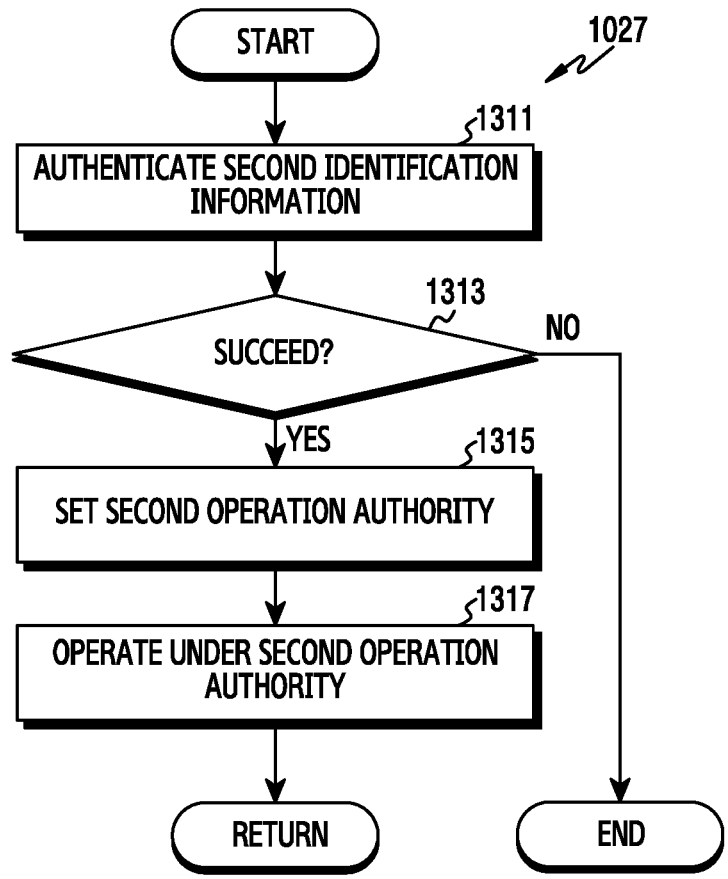
FIG. 13 is a flowchart illustrating an example operation of operating under a second operation authority in FIG. 10.

FIG. 13 is a flowchart illustrating an example operation of operating under the second operation authority in FIG. 10.

Referring to FIG. 13, the processor 416 may authenticate the second identification information in operation 1311. The electronic device 410 may compare the second identification information and the second identification information which has been already registered in operation 1011. In addition, the processor 416 may determine whether the electronic device 410 succeeds in authenticating the second identification information in operation 1313. According to an example embodiment, when the second identification information is the same as the already registered second identification information, the processor 416 may determine that the electronic device 410 succeeds in authenticating the second identification information. On the other hand, when the second identification information is different from the already registered second identification information, the processor 416 may determine that the electronic device 410 fails to authenticate the second identification information.

According to various example embodiments, when it is determined that the electronic device 410 succeeds in authenticating the second identification information in operation 1313, the processor 416 may set the second operation authority based on the second identification information in operation 1315. That is, the processor 416 may set a session for a logic connection between the user and the electronic device 410. In this case, the processor 416 may generate session information. In addition, the processor 416 may transmit the session information to the peripheral device 420 and may receive a token from the peripheral device 420. In addition, the processor 416 may detect the second operation authority according to the second identification information, and set the second operation authority for the corresponding session.

According to various example embodiments, the processor 416 may operate under the second operation authority in operation 1317. That is, the processor 416 may allow user's access to functions corresponding to the second operation authority, and block user's access to the other functions. For example, when the second operation authority includes a local authority and a network authority, the processor 416 may allow access to a file or a folder and may also allow sharing a notification event or relaying communication in cooperation with the peripheral device 420. Thereafter, the processor 416 may return to FIG. 10. To achieve this, the processor 416 may request cooperation from the peripheral device 420. In this case, the processor 416 may forward the session information and the token received from the peripheral device 420 to the peripheral device 420. When a response to the cooperation is received from the peripheral device 420, the processor 416 may share resources for the cooperation with the peripheral device 420. By doing so, the processor 416 may cooperate with the peripheral device 420 based on the resources, such that the electronic device 410 operates under the second operation authority.

According to various example embodiments, when it is determined that the electronic device 410 fails to authenticate the second identification information in operation 1313, the processor 416 may disregard the user's access request.

According to various example embodiments, when an end request is generated from the user while the electronic device 410 is operating under the second operation authority in operation 1027, the processor 416 may detect the end request in operation 1029. According to an example embodiment, when a request for inactivating the electronic device 410 is generated, the processor 416 may detect this request as the end request. According to another example embodiment, when the peripheral device 420 approaching the electronic device 410 is detected, the processor 416 may detect the peripheral device 420 approaching the electronic device 410 as the end request. In addition, the processor 416 may remove the setting of the second operation authority in operation 1031. In this case, the processor 416 may block user's access to the electronic device 410 and may end the session. In addition, the processor 416 may notify the peripheral device 420 that the session is ended.

Figure 14:
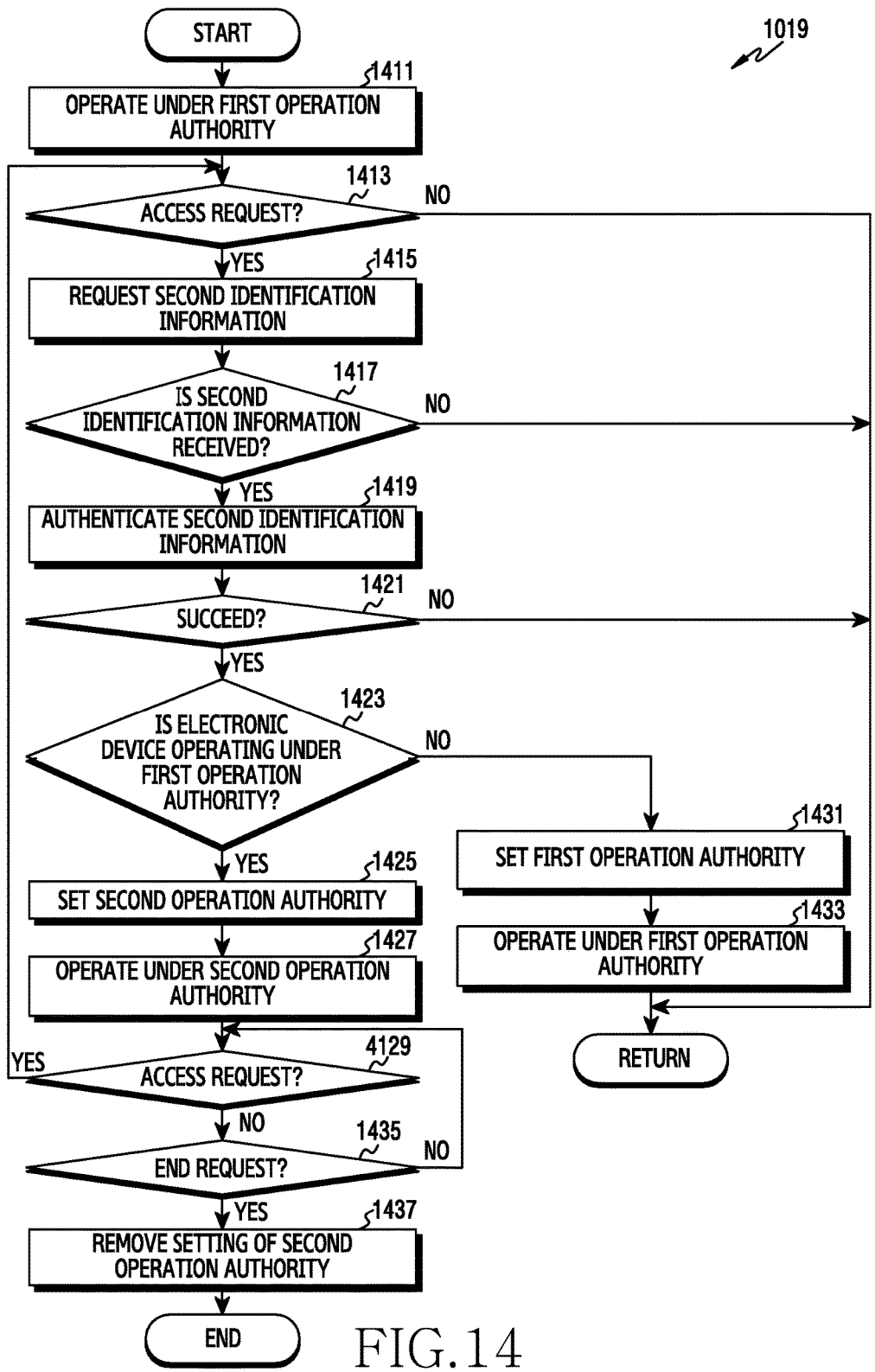
FIG. 14 is a flowchart illustrating an example operation of operating under the first operation authority in FIG. 10.

FIG. 14 is a flowchart illustrating an example operation of operating under the first operation authority in FIG. 10.

Referring to FIG. 14, the processor 416 may operate under the first operation authority in operation 1411. The processor 416 may set the first operation authority and operate under the first operation authority. According to an example embodiment, the processor 416 may set a setting count of the first operation authority to 1 and set a setting count of the second operation authority to 0. That is, the processor 416 may allow user's access to functions corresponding to the first operation authority, and may block user's access to the other functions. For example, when the first operation authority includes a local authority, the processor 416 may allow access to a file or a folder and may block sharing a notification event or relaying communication.

According to various example embodiments, when an access request is generated from the user while the electronic device 410 is operating under the first operation authority in operation 1411, the processor 416 may detect the access request in operation 1413. According to an example embodiment, when the electronic device 410 is activated, the processor 416 may detect the activation of the electronic device 410 as the access request. For example, the electronic device 410 may be activated in response to the electronic device 410 being booted or woken up. According to another example embodiment, when the peripheral device 420 approaching the electronic device 410 is detected, the processor 416 may detect the peripheral device 420 approaching the electronic device 410 as the access request. In addition, the processor 416 may request second identification information in operation 1415. That is, the processor 416 may request the second identification information from the peripheral device 420.

According to various example embodiments, when the second identification information is received from the peripheral device 420, the processor 416 may detect the second identification information being received in operation 1417. For example, the second identification information may be acquired from the peripheral device 420 and may be transmitted without being converted or may be converted and transmitted. In addition, the processor 416 may authenticate the second identification information in operation 1419. The electronic device 410 may compare the second identification information and the second identification information which has been already registered in operation 1011. In addition, the processor 416 may determine whether the electronic device 410 succeeds in authenticating the second identification information in operation 1421. According to an example embodiment, when the second identification information is the same as the already registered second identification information, the processor 416 may determine that the electronic device 410 succeeds in authenticating the second identification information. On the other hand, when the second identification information is different from the already registered second identification information, the processor 416 may determine that the electronic device 410 fails to authenticate the second identification information.

According to various example embodiments, when it is determined that the electronic device 410 succeeds in authenticating the second identification information in operation 1421, the processor 416 may determine whether the electronic device 410 is operating under the first operation authority or not in operation 1423. In other words, the processor 416 may determine whether the electronic device 410 is operating under the second operation authority or not. According to an example embodiment, the processor 416 may identify the setting count of the first operation authority and the setting count of the second operation authority. In addition, when the setting count of the first operation authority is 1 and the setting count of the second operation authority is 0, the processor 416 may determine that the electronic device 410 is operating under the first operation authority. On the other hand, when the setting count of the first operation authority is 0 and the setting count of the second operation authority is 1, the processor 416 may determine that the electronic device 410 is operating under the second operation authority.

According to various example embodiments, when it is determined that the electronic device 410 is operating under the first operation authority in operation 1423, the processor 416 may set the second operation authority based on the second identification information in operation 1425. According to an example embodiment, the processor 416 may change the setting count of the first operation authority to 0 and change the setting count of the second operation authority to 1. To achieve this, the processor 416 may reduce the setting count of the first operation authority by 1 and increase the setting count of the second operation authority by 1. In addition, the electronic device 410 may remove the setting of the first operation authority and may set the second operation authority. By doing so, the processor 416 may change the setting from the first operation authority to the second operation authority.

According to various example embodiments, the processor 416 may operate under the second operation authority in operation 1427. That is, the processor 416 may allow user's access to functions corresponding to the second operation authority and may block user's access to the other functions. For example, when the second operation authority includes a local authority and a network authority, the processor 416 may allow access to a file or a folder and also may allow sharing a notification event or relaying communication in cooperation with the peripheral device 420.

According to various example embodiments, when an access request is generated from the user while the electronic device 410 is operating under the second operation authority in operation 1427, the processor 416 may detect the access request in operation 1429. In addition, the processor 416 may return to operation 1415. In addition, the processor 416 may repeat operations 1415 to 1423.

According to various example embodiments, when it is determined that the electronic device 410 is operating under the second operation authority in operation 1423, the processor 416 may set the first operation authority based on first identification information in operation 1431. According to an example embodiment, the processor 416 may change the setting count of the first operation authority to 1 and change the setting count of the second operation authority to 0. To achieve this, the processor 416 may increase the setting count of the first operation authority by 1 and reduce the setting count of the second operation authority by 1. In addition, the processor 416 may remove the setting of the second operation authority and may set the first operation authority. By doing so, the processor 416 may change the setting from the second operation authority to the first operation authority.

According to various example embodiments, the processor 416 may operate under the first operation authority in operation 1433. That is, the processor 416 may allow user's access to functions corresponding to the first operation authority and may block user's access to the other functions. Thereafter, the processor 416 may return to FIG. 10.

According to various example embodiments, when the access request is not generated from the user in operation 1429 and an end request is generated from the user, the processor 416 may detect the end request in operation 1435. According to an example embodiment, when a request for inactivating the electronic device 410 is generated, the processor 416 may detect this request as the end request. According to another example embodiment, when the peripheral device 420 approaching the electronic device 410 is detected, the processor 416 may detect the peripheral device 420 approaching the electronic device 410 as the end request. In addition, the processor 416 may remove the setting of the second operation authority in operation 1437. In this case, the processor 416 may block user's access to the electronic device 410 and may end the session. In addition, the processor 416 may notify the peripheral device 420 that the session is ended.

According to various example embodiments, the operating method of the electronic device 410 may include: acquiring one of a plurality of pieces of identification information which are already registered; setting one of a plurality of function sets which are already registered based on the acquired identification information; and allowing a user's access according to the set function set.

According to various example embodiments, the operating method of the electronic device 410 may further include: detecting a user's access; and requesting the user to input the plurality of pieces of registered identification information.

According to various example embodiments, the requesting may include at least one of: requesting an input of at least one of the plurality of pieces of registered identification information using the peripheral device 420 wirelessly connected; or providing a user interface for inputting at least one of the plurality of pieces of registered identification information.

According to various example embodiments, the set function set may include a function of operating in cooperation with the peripheral device.

According to various example embodiments, the allowing may include notifying a notification event received from the peripheral device.

According to various example embodiments, the allowing may include using the peripheral device 420 as a repeater between the electronic device 410 and a communication network.

According to various example embodiments, the operating method of the electronic device 410 may include: detecting an end request of the user; and removing the set function set.

According to various example embodiments, the operating method of the electronic device 410 may further include: detecting the user's access; acquiring another of the plurality of pieces of registered identification information; removing the set function set; setting another of the plurality of registered function sets based on the another identification information; and allowing the user's access according to the another function set.

According to various example embodiments, the setting may include increasing a setting count by 1 according to the set function set.

According to various example embodiments, the removing may include reducing a setting count by 1 according to the removed function set.

The term "module" used herein may represent, for example, a unit including hardware, software or firmware. The term "module" may be interchangeably used with the terms "logic," "logical block," "component" and "circuit". The "module" may be an integrated component or a minimum unit which performs one or more functions, or a part thereof. The "module" may be implemented mechanically or electronically. For example, the "module" may include a dedicated processor, a CPU, various processing circuitry, an application-specific integrated circuit (ASIC) chip, a field-programmable gate array (FPGA), and a programmable-logic device for performing some operations, which are known or will be developed.

At least a portion of an apparatus (e.g., modules or functions thereof) or a method (e.g., operations) according to various example embodiments of the present disclosure, for example, may be implemented by instructions stored in a computer-readable storage media (for example, the memory 130) in the form of a programmable module. The instructions, when executed by a processor (for example, the processor 120), may perform a function corresponding to the instructions. A computer-readable recording media may include a hard disk, a floppy disk, a magnetic medium (e.g., a magnetic tape), an optical medium (e.g., compact disc read only memory (CD-ROM) and a digital versatile disc (DVD)), a magneto-optical medium (e.g., a floptical disk), and an internal memory. The instructions may include a code generated by a compiler or a code executed by an interpreter.

According to various example embodiments, a recording medium may record a program for performing: acquiring one of a plurality of pieces of identification information which are already registered; setting one of a plurality of function sets which are already registered based on the acquired identification information; and allowing a user's access according to the set function set.

A module or a program module according to various example embodiments may include at least one of the above components, or some of the above components may be omitted, or additional other elements may be further included. Operations performed by a module, a program module, or other components according to various example embodiments may be executed sequentially, in parallel, repeatedly, or in a heuristic method. Also, some of the operations may be executed in different sequences, omitted, or other operations may be added.

According to various example embodiments, the electronic device 410 and the operating method thereof allocate a plurality of operation authorities according to a plurality of pieces of identification information, such that a security level is set for each identification information. By doing so, the security of the electronic device 410 can be enhanced.

While various example embodiments have been described in the detailed descriptions of the present disclosure, various changes can be made without departing from the scope of the present disclosure. Therefore, the scope of the present disclosure should not be limited to and defined by the above-described example embodiments, and should be defined not only by the appended claims but also by the equivalents to the scopes of the claims.

What is claimed is:

1. An electronic device comprising:
a memory storing a first piece of identification information, a second piece of identification information, a first function set related to a first operating authority, and a second function set related to a second operation authority;
an input circuitry;
a sensor;
a communication unit comprising communication circuitry; and
a processor functionally connected to the memory, the input circuitry, the communication circuitry, and the sensor, and
wherein the processor is configured to:
detect a first request for access to the electronic device through the input circuitry or the sensor;
acquire the first piece of identification information or the second piece of identification information in response to the first request;
set the first function set when the first piece of identification information is acquired;
set the second function set when the second piece of identification information is acquired;
remove the first function set on the basis of a determination that the electronic device is operating under the first operation authority when the second piece of identification information is acquired;
remove the second function set on the basis of a determination that the electronic device is operating under the second operation authority when the first piece of identification information is acquired; and
allow access based on the set function set of the first function set and the second function set,
wherein the first piece of identification information is acquired through the input circuitry or the sensor, and the second piece of identification information is acquired through the communication unit from a peripheral device to be wirelessly connected to the electronic device via the communication circuitry,
wherein the first function set comprises a function of operating independently in the electronic device, and the second function set comprises a function of operating in cooperation with the peripheral device, and
wherein the second function set comprises a function of sharing a notification event with the peripheral device.

2. The electronic device of claim 1, wherein the first request is detected when the electronic device is activated or the sensor detects a peripheral device approaching the electronic device.

3. The electronic device of claim 1, further comprising a display functionally connected to the processor, and
wherein the processor is further configured to provide a user interface for inputting the first piece of identification information or the second piece of identification information through the display.

4. The electronic device of claim 1, wherein the second function set comprises a function for using the peripheral device as a repeater between the electronic device and a communication network.

5. The electronic device of claim 2, wherein the processor is further configured to:
detect a second request; and
remove the set function set, and
wherein the second request is detected when the electronic device is inactivated or the sensor detects the peripheral device approaching the electronic device after the first request is detected.

6. The electronic device of claim 5, wherein the processor is further configured to increase a setting count by 1 based on the set function set, and to reduce the setting count by 1 based on the removed function set.

7. A method of operating an electronic device, comprising:
detecting a first request for access of the electronic device through an input circuitry or a sensor of the electronic device;
acquiring a first piece of identification information or a second piece of identification information in response to the first request, the first piece of identification information and the second piece of identification information stored in a memory of the electronic device;
setting a first function set related to a first operation authority when the first piece of identification information is acquired, the first function set stored in the memory;
setting a second function set related to a second operation authority when the second piece of identification information is acquired, the second function set stored in the memory;
removing the first function set on the basis of a determination that the electronic device is operating under the first operation authority when the second piece of identification information is acquired;
removing the second function set on the basis of a determination that the electronic device is operating under the second operation authority when the first piece of identification information is acquired; and
allowing access based on the set function set of the first function set and the second function set,
wherein the first piece of identification information is acquired through the input circuitry or the sensor, and the second piece of identification information is acquired from a peripheral device wirelessly connected to the electronic device, wherein the first function set comprises a function of operating independently in the electronic device, and the second function set comprises a function of operating in cooperation with the peripheral device, and wherein the second function set comprises a function of sharing a notification event with the peripheral device.

8. The operating method of claim 7, wherein the first request is detected when the electronic device is activated or the sensor detects a peripheral device approaching the electronic device.

9. The operating method of claim 7, wherein the second function set comprises a function for using the peripheral device as a repeater between the electronic device and a communication network.

10. The operating method of claim 8, further comprising:
detecting a second request; and
removing the set function set, and
wherein the second request is detected when the electronic device is inactivated or the sensor detects the peripheral device approaching the electronic device after the first request is detected.

11. The operating method of claim 10, further comprising:
increasing a setting count by 1 based on the set function set, and
reducing the setting count by 1 based on the removed function set.

12. A non-transitory computer readable recording medium having program instructions, a first piece of identification information, a second piece of identification information, a first function set related to a first operation authority and a second function set related to a second operation authority stored thereon, which, when executed by at least one processor, cause the at least one processor to perform at least one operation, the at least one operation comprising:

detecting a request for access to an electronic device through an input circuitry or a sensor of the electronic device;

acquiring the first piece of identification information or the second piece of identification information in response to the request;

setting the first function set when the first piece of identification information is acquired;

setting the second function set when the second piece of identification information is acquired;

removing the first function set on the basis of a determination that the electronic device is operating under the first operation authority when the second piece of identification information is acquired;

removing the second function set on the basis of a determination that the electronic device is operating under the second operation authority when the first piece of identification information is acquired; and allowing access based on the set function set of the first function set and the second function set, wherein the first piece of identification information is acquired through the input circuitry or the sensor, and the second piece of identification information is acquired from a peripheral device wirelessly connected to the electronic device, wherein the first function set comprises a function of operating independently in the electronic device, and the second function set comprises a function of operating in cooperation with the peripheral device, and wherein the second function set comprises a function of sharing a notification event with the peripheral device.

* * * * *